(12) United States Patent
Donnigan

(10) Patent No.: US 9,211,846 B2
(45) Date of Patent: Dec. 15, 2015

(54) RECEIVER MOUNTED SPORTING EQUIPMENT RACK WITH LONGITUDINAL LOAD BARS

(71) Applicant: Stephen Norman Donnigan, Highlands Ranch, CO (US)

(72) Inventor: Stephen Norman Donnigan, Highlands Ranch, CO (US)

( * ) Notice: Subject to any disclaimer, the term of this patent is extended or adjusted under 35 U.S.C. 154(b) by 46 days.

(21) Appl. No.: 14/214,951

(22) Filed: Mar. 16, 2014

(65) Prior Publication Data

US 2014/0291370 A1 Oct. 2, 2014

Related U.S. Application Data

(60) Provisional application No. 61/798,860, filed on Mar. 15, 2013.

(51) Int. Cl.
*B60R 9/08* (2006.01)
*B60R 9/06* (2006.01)

(52) U.S. Cl.
CPC .... *B60R 9/06* (2013.01); *B60R 9/08* (2013.01)

(58) Field of Classification Search
CPC .................................... B60R 9/06; B60R 9/08
See application file for complete search history.

(56) References Cited

U.S. PATENT DOCUMENTS

| | | | |
|---|---|---|---|
| 3,796,333 A * | 3/1974 | Goldstein | 414/462 |
| 4,646,952 A * | 3/1987 | Timmers | 224/485 |
| 4,744,590 A * | 5/1988 | Chesney | 280/769 |
| 5,009,337 A | 4/1991 | Bimbi | |
| 5,413,260 A | 5/1995 | McFarland | |
| 5,460,304 A | 10/1995 | Porter et al. | |
| 5,476,201 A | 12/1995 | Hall et al. | |
| 5,560,666 A | 10/1996 | Vieira et al. | |
| 5,570,825 A * | 11/1996 | Cona | 224/495 |
| 5,586,702 A * | 12/1996 | Sadler | 224/521 |
| 5,664,717 A | 9/1997 | Joder | |
| 5,676,292 A * | 10/1997 | Miller | 224/524 |
| 5,680,976 A | 10/1997 | Koliopoulos et al. | |
| 5,800,294 A | 9/1998 | Naecker, Jr. | |
| 5,806,737 A | 9/1998 | Clark | |
| 5,820,004 A | 10/1998 | Lane | |
| 5,938,092 A | 8/1999 | Johnson | |
| 5,950,890 A | 9/1999 | Darby | |
| 5,996,870 A | 12/1999 | Shaver | |
| 6,010,049 A | 1/2000 | Stein | |
| 6,019,266 A * | 2/2000 | Johnson | 224/534 |
| 6,050,627 A | 4/2000 | Lee | |
| 6,095,387 A * | 8/2000 | Lipscomb | 224/485 |
| 6,179,184 B1 | 1/2001 | Belinky et al. | |
| 6,237,823 B1 | 5/2001 | Stewart et al. | |
| 6,237,824 B1 | 5/2001 | Bagley | |
| 6,296,290 B1 * | 10/2001 | Wolf | 296/61 |
| 6,460,887 B2 | 10/2002 | Tremblay | |
| 6,511,088 B2 | 1/2003 | Kahlstorf | |
| 6,616,022 B1 | 9/2003 | Naastad | |

(Continued)

*Primary Examiner* — Brian D Nash
(74) *Attorney, Agent, or Firm* — Barber Legal; Craig Barber

(57) ABSTRACT

A sporting goods carrier combines the standardized racks and flexibility of a car top carrier with the ease of access and gas conservation of a hitch mounted carrier by providing standard roof rails extending parallel to the mount (and thus parallel to the vehicle) so that sporting equipment such as bicycles, skis and so on may be carried cross-wise to the vehicle at the rear. Using standardized load bars allows the hitch mounted device to accept the many types of roof rack sports equipment carriers already on the market. Load bars may be tilted, U-shaped, moved in and outward and the mount may be rotated below bumper level to allow easy loading and unloading of the vehicle.

16 Claims, 45 Drawing Sheets

(56) References Cited

U.S. PATENT DOCUMENTS

| | | |
|---|---|---|
| 6,662,983 B2 | 12/2003 | Lane et al. |
| 6,845,895 B2 | 1/2005 | Jones et al. |
| 6,866,315 B2 | 3/2005 | Adams et al. |
| 6,874,804 B2 | 4/2005 | Reese et al. |
| 6,997,497 B2 | 2/2006 | Sagi et al. |
| 7,111,765 B1 | 9/2006 | Blakley |
| 7,222,763 B2 | 5/2007 | Pedrini |
| 7,784,657 B2 | 8/2010 | Blakley |
| 7,815,084 B2 | 10/2010 | Allen et al. |
| 8,141,760 B2 | 3/2012 | Kuschmeader et al. |
| 8,240,529 B1 | 8/2012 | Bell, III |
| 8,281,969 B2 | 10/2012 | Schmidlkofer |
| 2003/0011169 A1* | 1/2003 | McCoy et al. ............ 280/491.2 |
| 2003/0057245 A1* | 3/2003 | Dean ........................ 224/519 |
| 2003/0226867 A1* | 12/2003 | Knizner ..................... 224/521 |
| 2004/0004099 A1* | 1/2004 | Crouch ...................... 224/499 |
| 2004/0040995 A1* | 3/2004 | Ferrigan .................... 224/512 |
| 2008/0099522 A1* | 5/2008 | Clausen et al. ............ 224/519 |
| 2009/0120984 A1* | 5/2009 | Sautter et al. .............. 224/497 |
| 2009/0140024 A1* | 6/2009 | McLemore et al. ......... 224/519 |
| 2011/0193319 A1* | 8/2011 | Durand ..................... 280/491.1 |
| 2013/0264367 A1* | 10/2013 | Hill ........................... 224/413 |
| 2014/0167439 A1* | 6/2014 | Sorensen ................ 296/26.11 |
| 2014/0263512 A1* | 9/2014 | McCoy et al. ............. 224/519 |

* cited by examiner

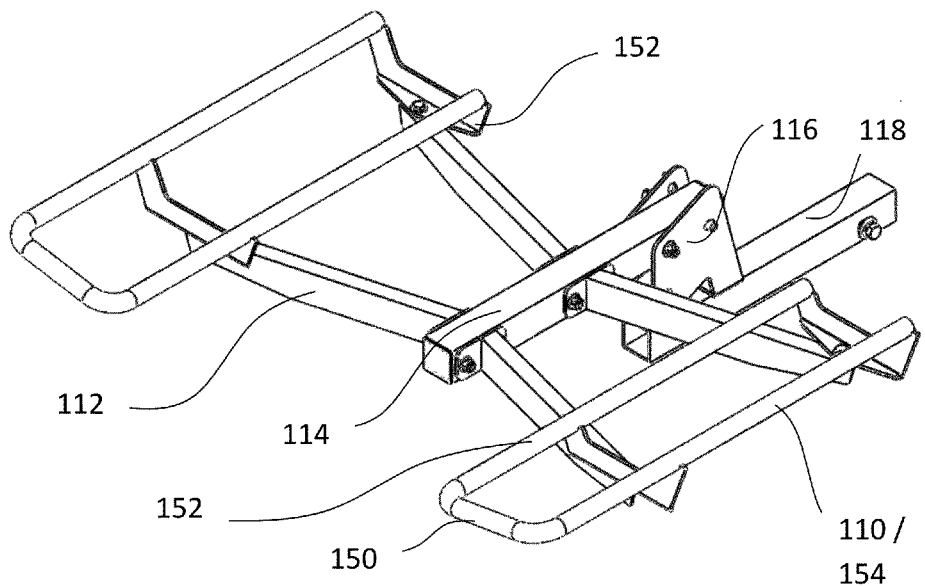
Figure 14
Figure 15
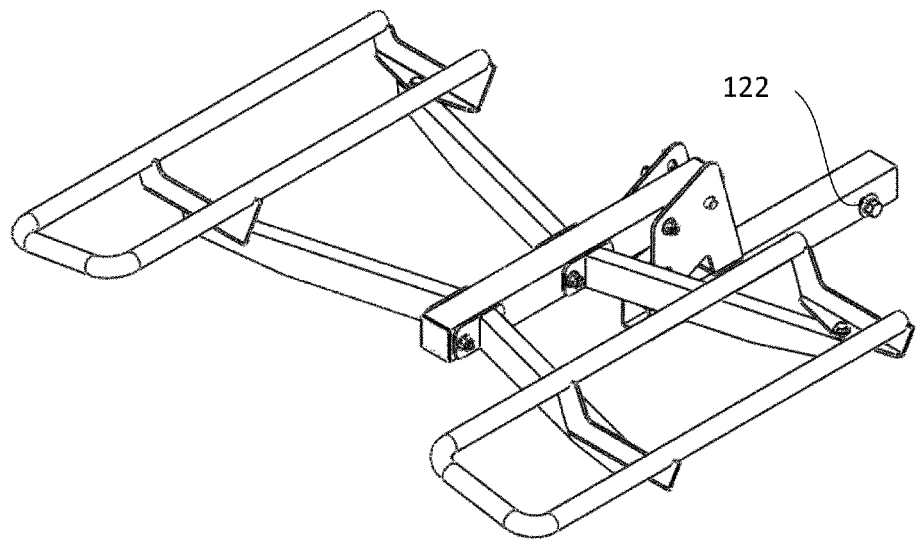

RECEIVER MOUNTED SPORTING EQUIPMENT RACK WITH LONGITUDINAL LOAD BARS

CROSS REFERENCE TO RELATED APPLICATIONS

This application claims the priority and benefit of U.S. Provisional Application No. 61/798,860, filed Mar. 15, 2013 in the name of the same inventor, Stephen Norman Donnigan.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

TECHNICAL FIELD/FIELD OF THE INVENTION

The present invention relates to carriers/racks, in particular vehicle mounted carriers/racks located on the rear of a vehicle.

SUMMARY OF INVENTION

Technical Problem and Background Art/Background of the Invention

As cars have grown smaller and the size and amount of outdoor sports equipment owned and used by car owners has increased, the problem of carrying sporting and outdoor equipment in or on vehicles has increased. The bicycle is one obvious example: a 1960's vintage land cruiser would easily hold a single bicycle, fully assembled, in its capacious trunk. A more modern vehicle usually has to have a rear row of seats folded down in order to accommodate a single unassembled bicycle, but modern families going bicycling will usually need to transport two or more bicycles.

A number of solutions are of course known. In general, these fall into several broad categories: trailers, car top carriers (car top racks), and front and rear mounted carrier/rack units.

"Toy hauler" trailers are spacious and easy to use. They are also expensive, awkward to tow, and use up valuable storage space (in the form of parking) during the 98% of the time that they are parked at home, unused.

Car top carriers/racks are common, standard, inexpensive, take up little space and are in most ways very practical. An industry exists to supply general purpose car top carriers and racks which in turn support specialized carriers adapted to hold outdoor and sporting equipment. Yakima® and Thule® brands of roof top racks are well known examples of this. (Trademark owners not associated with present applicant.) Such racks are virtually standard for outdoor sports lovers, yet these racks do have some deficiencies.

One issue with car top carrier racks is gas mileage impact. The increased frontal area of the vehicle with the rack on top results in greatly increased form drag, skin friction and even interference drag. These effects can become extreme. For example, a Toyota 4Runner® brand vehicle with a car top carrier might suffer a decrease of only one or two miles per gallon in fuel efficiency. On the other hand a Toyota Prius® brand motor vehicle can be observed to suffer a penalty of 10 miles per gallon merely from using a car top carrier having a cargo container. (Trademark owners not associated with present applicant.)

Another issue with the car top carrier rack is the placement of the device atop the vehicle. Frankly, for some individuals such racks can be almost impossible to use, while even those who can access roof racks are aware of the difficulty of putting sporting equipment atop the vehicle without damaging either the vehicle or the equipment, both of which are likely to be fairly expensive.

Hitch mounted and bumper mounted devices located at the front and rear of the vehicle seem to offer one potential route to the best of both worlds, and yet, such devices have not taken over the market, indeed, the standard remains the roof mounted rack.

There are other issues with such devices. For example, the roof top carrier adds a few inches to the height of the vehicle, the specialized rack on the carrier adds a few more inches to the height, and then the sporting equipment may add more height to the vehicle. The problems this may cause with mileage have been adverted to, however, the clearance itself becomes a problem as owners occasionally forget and drive their vehicle, with expensive bicycles or other equipment still on the top, through a garage door which lacks sufficient clearance. This can result in disastrous damage to expensive sporting equipment, vehicle, and building structure.

Rear and front mounted devices offer no increase in the frontal cross section of the vehicle and thus provide very little added form drag. They are not mounted high off the ground and thus are as easily accessed as trailers, yet they do not require parking space, unlike trailers, and do not present the constant awkwardness of towing.

An example of this is found in U.S. Pat. No. 7,784,657 (related to U.S. Pat. No. 7,111,765 and related applications, and pictured at website www.wizardkinetics.com). This design is shown in FIG. 13, "Prior Art". In this design the entire carrier assemble is swung to the horizontal for loading. Note that sporting equipment is fastened to the device in the fore-and-aft direction, that is, a bicycle is put with the wheels oriented the same direction as the wheels of the carrier vehicle. Being extremely long as a result of this orientation, it then becomes necessary to raise the device vertically before transportation. The result is that the sporting equipment is actually carried vertically, running up the back of the vehicle into the air.

This device is also a complex solution for the task of hauling lightweight sporting equipment. In particular, the device is depicted with two vertical framework members in addition to the hitch mount member and the one vertical and two horizontal members which actually support sporting equipment. In addition, the device is designed for constant change from the horizontal mode for loading and unloading to the vertical mode for transportation. Thus, the device is larger and heavier than might be expected.

Another attempt to solve this problem may be found at http://www.innoracks.com/details/inh100hitchbase/. However, the Inno Advanced Car Rack INH100 Hitch Base is only supported at the base of the rack. The result of this lack of support is that items on the rack, and the entire rack itself, will sway and oscillate during transportation. The Inno rack also lacks any structure for adjusting arm widths which are permanently attached, thus making switching to other types of accessories more time consuming. Thus with the Inno INH100, users could not benefit from having multiple load bars and switching accessories and bars all at once, rather, the bars must left on and the accessories only switched. In addition, it lacks appropriate structure and thus cannot tilt downward from the hitch level toward the ground for loaded access to the vehicle rear end.

Other rear mounted devices do not do this "up the back" orientation but lack any attempt at standardization with the customary roof rack mounted devices. While the orientation is sensible, the device is not standardized for customary types of sporting equipment, that is, one cannot remove the bike racks and substitute ski racks, nor can one use the standardized carriers which are specialized for skis or other equipment with the same hitch mounted carrier. That is, the carrier/rack cannot have the bike racks removed and ski racks installed or ski racks removed and luggage carriers installed as the seasons change.

Various reasons may be presented for the popularity of roof mounted carrier devices over rear and front mounted carrier devices.

One contributing reason is almost certainly standardization. Each of the Thule® and Yakima® types of roof mounted racks offers a standard type of cross bar (rectangular cross section or round cross section) to which specialized equipment carriers are then clamped. This neatly synergizes with the problem that most rear or front mounted racks can be used with only one type of sporting equipment.

Another contributing reason appears to be cost. The typical car top rack might cost approximately three to five hundred dollars. The previously discussed Wizard Kinetics rear-mounted device is on sale, albeit apparently without significant commercial presence or success, at a price point above a roof rack/carrier. This is probably due to the aforementioned issues with design complexity.

Thus it would be preferable to provide a device which actually does combine the low cost, standardization and multiple uses of the roof rack with the ease of use of the trailer and the energy conservation benefits of the rear hitch mount.

A note on terminology: In common usage "Hitch" may refer to the part of the vehicle adapted for connection to a trailer OR to the part of the trailer adapted for connection to the tow vehicle. For purposes of this application, the "receiver", "hitch" or "tow hitch" refers to a tow hitch receiver comprising a tube (usually of square cross-section) semi-permanently attached to the frame of the vehicle. The "mount" is that part which slides into the receiver. For purposes of this application, the "load bars" or "standardized load bars" refer to any commercially available and commonly used bars, now known or later developed, which are in prior art used on a car top carrier, running across the vehicle from side to side and used to hold accessories which are adapted to hold particular pieces of sporting equipment. These may from time to time be referred to as "roof racks" or "roof rack load bars" herein.

Solution to Problem/Summary of Invention

The present invention teaches a carrier (rack) mounted (attached) to a receiver of a vehicle. The carrier is supported by the receiver and is thus not a trailer. The carrier features at least two standard sports equipment roof rack load bars ("load bars") which are oriented parallel to the mount and thus parallel to the axis of the vehicle. This in turn means that the device may then support the numerous standard load bar sports equipment holding devices already on the market, which are themselves specialized for holding of sports equipment of various types.

Thus, the device may be broadly considered to be an exact substitute or identical replacement for the roof racks sold by manufacturers such as those discussed previously. Manufacturers make carriers for mounting on standardized roof rack rails which are specialized or adapted to hold bicycles, skis, snowboards, kayaks, cargo containers for miscellaneous equipment and so on and so forth.

However, since the rails are mounted fore-and-aft rather than in the usual roof top orientation of side-to-side, equipment is held cross-wise to the usual roof-top orientation. On the roof of the vehicle, the fore-and-aft direction provides more space, but having extremely long projections from the rear of the vehicle is undesirable, as shown by the fact that the U.S. Pat. No. 7,784,657 suggests raising the sports equipment up vertically for transport.

The invention thus teaches a mount attached to the receiver, at least two supports extending at highly oblique or right angles from the mount and vehicle axis, which in turn support the standard load bars parallel to the mount and vehicle body rather than running across it.

The distance between the standard roof rack rails/load bars may be varied, for example by means of pins which may be inserted to hold the load bars at various distances from one another. In addition, the quick disconnect of the invention allows the user to conveniently remove accessories by removing the entire set of load bars with the accessories still attached, forming a rigid frame due to the crossing of the load bars and the accessories.

In addition, the mount does not have any vertical members, rather, some of the horizontal members can swing vertically or below horizontally.

Summary in Reference to Claims

It is therefore a first aspect, objective, advantage and embodiment of the present invention to provide a sporting equipment carrier for use with a vehicular receiver mounted on a vehicle having a bumper, the carrier comprising:

a mount; the mount having a horizontal member having a first end extending into the receiver and a second end protruding from such receiver, the mount lacking a vertical member;

a main rack member extending from the mount;

a plurality of secondary members extending horizontally from and perpendicular to the main rack member;

a plurality of standard load bars extending horizontally from the secondary members and parallel to the mount, and perpendicular to such vehicle bumper.

It is therefore a second aspect, objective, advantage and embodiment of the present invention to provide a sporting equipment carrier further comprising:

a pivot connecting the mount to the main rack member, the pivot having at least three positions, a first position in which the main rack member, secondary rack members and standard load bars remain horizontal and a second position in which the main rack member, secondary rack members and standard load bars rotate to a vertical orientation, and a third position in which the main rack member, secondary rack members and standard load bars rotate below the horizontal first position.

It is therefore another aspect, objective, advantage and embodiment of the present invention to provide a sporting equipment carrier further comprising:

a plurality of positions at which the standard load bars may be placed, whereby a distance between the standard load bars may be changed.

It is therefore a first aspect, objective, advantage and embodiment of the present invention to provide a sporting equipment carrier further comprising: a plurality of quick disconnect couplers connecting the standard load bars to the secondary rack members, whereby the standard load bars may be easily removed, whereby a second different group of standard load bars may be easily installed.

It is therefore another aspect, objective, advantage and embodiment of the present invention to provide a sporting equipment carrier wherein each quick disconnect coupler further comprises:

at least one hole passing through the disconnect coupler, the hole through the disconnect coupler aligning to a hole passing through the secondary rack members, and a bolt passing through both of the holes;

and at least one slot oriented to open downward;

the secondary rack member having thereon at least one post dimensioned and configured to engage the at least one slot of the quick disconnect coupler when the two holes are aligned.

It is therefore a first aspect, objective, advantage and embodiment of the present invention to provide a sporting equipment carrier wherein each standard load bar further comprises:

a U shaped planform having inner and outer parts and and end part connecting the inner and outer parts.

It is therefore another aspect, objective, advantage and embodiment of the present invention to provide a sporting equipment carrier wherein each quick disconnect couple further comprises:

a central portion connected to one of the secondary rack members and two leg portions extending upward, wherein the leg portions are of different lengths;

whereby when the quick disconnect coupler is connected to one of the secondary rack members in a first position, the inner part of the standard load bar is higher than the outer part of the standard load bar, and when the quick disconnect coupler is connected to one of the secondary rack members in a second position, the outer part of the standard load bar is higher than the inner part of the standard load bar.

It is therefore another aspect, objective, advantage and embodiment of the present invention to provide a sporting equipment carrier wherein the pivot further comprises:

a plate having an arcuate race passing therethrough, the plate secured to the mount;

a hinge bolt passing through the plate and through the main rack member whereby they are pivotally attached;

an adjustment knob having an extension passing through the plate and through the main rack member, the adjustment knob having first and second adjustment positions, the first adjustment position being loose whereby the main rack member may pivot in relation to the mount and the pivot may attain any of the first, second and third pivot positions, the second adjustment position being tight, whereby the main rack member is secured and may not pivot.

It is therefore another aspect, objective, advantage and embodiment of the present invention to provide a sporting equipment carrier comprising:

a mount; the mount having a horizontal member having a first end extending into the receiver and a second end protruding from such receiver, the mount lacking a vertical member;

a main rack member extending from the mount;

a plurality of secondary members extending horizontally from the main rack member at an angle thereto, the secondary members having a C-beam cross-section;

a plurality of standard load bars extending horizontally from the secondary members and parallel to the mount.

It is therefore another aspect, objective, advantage and embodiment of the present invention to provide a sporting equipment carrier further comprising:

a pivot connecting the mount to the main rack member, the pivot having at least three positions, a first position in which the main rack member, secondary rack members and standard load bars remain horizontal and a second position in which the main rack member, secondary rack members and standard load bars rotate to a vertical orientation, and a third position in which the main rack member, secondary rack members and standard load bars rotate below the horizontal first position.

It is therefore another aspect, objective, advantage and embodiment of the present invention to provide a sporting equipment carrier further comprising:

a plurality of positions at which the standard load bars may be placed, whereby a distance between the standard load bars may be changed.

It is therefore another aspect, objective, advantage and embodiment of the present invention to provide a sporting equipment carrier further comprising:

a plurality of quick disconnect couplers connecting the standard load bars to the secondary rack members, whereby the standard load bars may be easily removed, whereby a second different group of standard load bars may be easily installed.

It is therefore yet another aspect, objective, advantage and embodiment of the present invention to provide a sporting equipment carrier wherein each quick disconnect coupler further comprises:

at least one hole passing through the disconnect coupler, the hole through the disconnect coupler aligning to a hole passing through the secondary rack members, and a bolt passing through both of the holes;

and at least one slot oriented to open downward;

the secondary rack member having thereon at least one post dimensioned and configured to engage the at least one slot of the quick disconnect coupler when the two holes are aligned.

It is therefore another aspect, objective, advantage and embodiment of the present invention to provide a sporting equipment carrier wherein each standard load bar further comprises:

a U shaped planform having inner and outer parts and and end part connecting the inner and outer parts.

It is therefore another aspect, objective, advantage and embodiment of the present invention to provide a sporting equipment carrier wherein each quick disconnect couple further comprises:

a central portion connected to one of the secondary rack members and two leg portions extending upward, wherein the leg portions are of different lengths;

whereby when the quick disconnect coupler is connected to one of the secondary rack members in a first position, the inner part of the standard load bar is higher than the outer part of the standard load bar, and when the quick disconnect coupler is connected to one of the secondary rack members in a second position, the outer part of the standard load bar is higher than the inner part of the standard load bar.

It is therefore another aspect, objective, advantage and embodiment of the present invention to provide a sporting equipment carrier further wherein the pivot further comprises:

a plate having an arcuate race passing therethrough, the plate secured to the mount;

a hinge bolt passing through the plate and through the main rack member whereby they are pivotally attached; an adjustment knob having an extension passing through the plate and through the main rack member, the adjustment knob having first and second adjustment positions, the first adjustment position being loose whereby the main rack member may pivot in relation to the mount and the pivot may attain any of the first, second and third pivot positions, the second adjustment position being tight, whereby the main rack member is secured and may not pivot.

Advantageous Effects of Invention

The present invention teaches a device which uses standardized load bars, thus allowing easy use of the many specialized sporting equipment carrier devices which are already on the market and are designed for use with such standardized load bars.

The present invention further teaches a device which does not increase the frontal area of the carrying vehicle and is thus greatly advantageous over roof racks in terms of energy conservation.

The present invention further teaches a device which is not located atop the vehicle, and thus is easy to access and use.

The present invention further teaches a device which is of lower cost than a trailer and requires no parking space.

BRIEF DESCRIPTION OF DRAWINGS

FIG. 14 is an isometric view of an alternative preferred embodiment of the invention, showing the invention in a position of usage, without accessory special purpose sporting equipment carriers, and with the standardized load bars tilted so that the outer bar on each side is higher than the inner bar.

FIG. 15 is an isometric view of the alternative preferred embodiment of the invention, with the standardized load bars tilted so that the inner bar on each side is higher than the outer bar.

FIG. 54 is a side view of the device in the vertical position for stowage, when not in use, but with the accessory bicycle racks left on.

FIG. 55 is an isometric view of the device in the vertical position for stowage, but with the accessory racks left on.

FIG. 56 is an isometric view of the device in the vertical position but in use, with sporting equipment which allows for vertical transportation and with the accessory racks (ski gear) left on.

DESCRIPTION OF EMBODIMENTS/DETAILED DESCRIPTION OF DIAGRAMS

Figure 1:
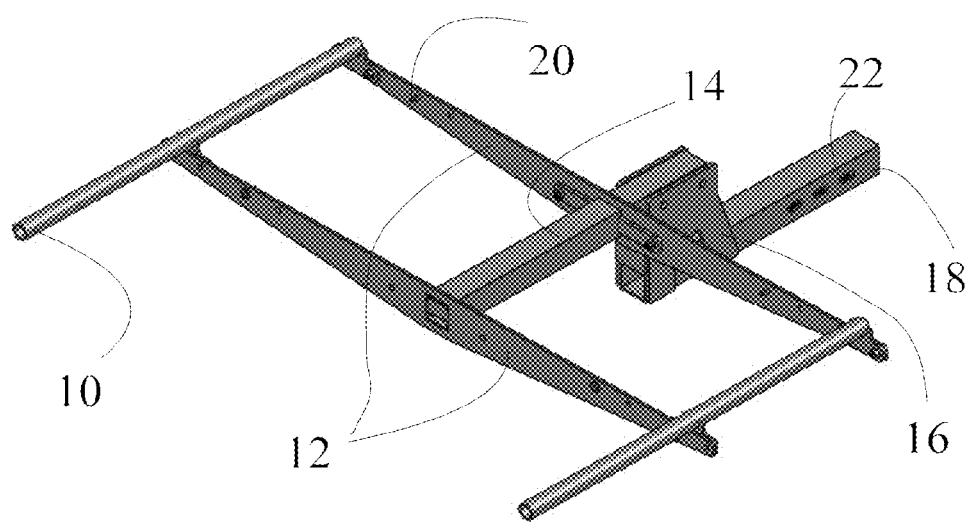
FIG. 1 is an isometric view of the invention showing major components of the device.

FIG. 1 is an isometric view of the invention showing major components of the device. The standardized load bars 10 may be seen, supported by the secondary rack members 12, and the main rack member 14.

Swivel 16 connects the rack directly to the horizontal mount 18, thus obviating the need for vertical members. The mount 18 has several choices of connection points 22 allowing it to be mounted to the vehicle at a choice of distances from the vehicle.

Figure 2:
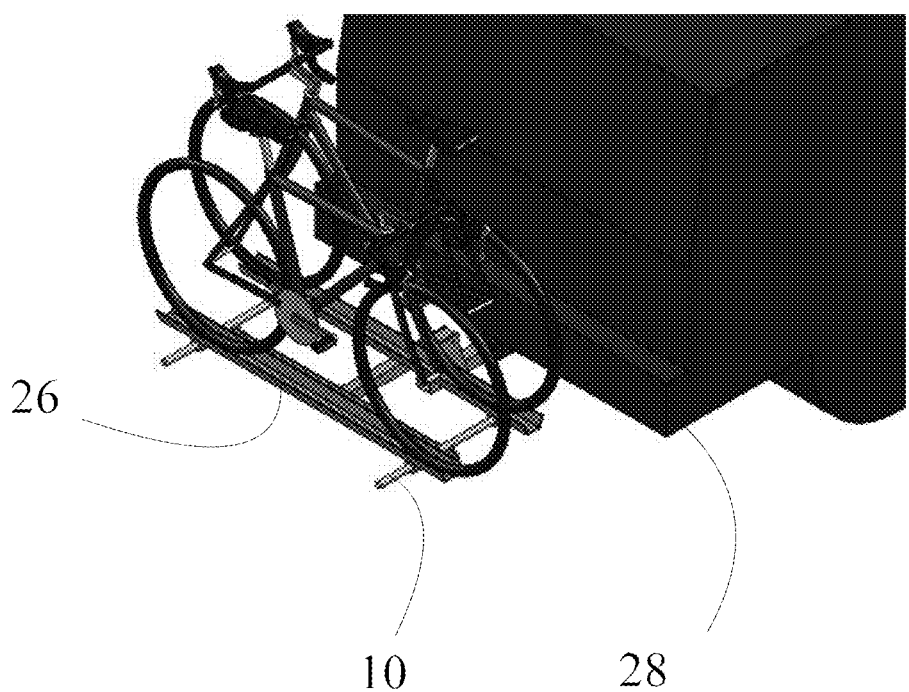
FIG. 2 is an isometric view of the invention showing the device mounted on a vehicle, with two special purpose sporting equipment carriers (for bicycles) mounted on the standardized load bars of the invention.

FIG. 2 is an isometric view of the invention showing the device mounted on a vehicle 28, with two (accessories) special purpose sporting equipment carriers 26 (for bicycles) mounted on the standardized load bars 10 of the invention.

Figure 3:
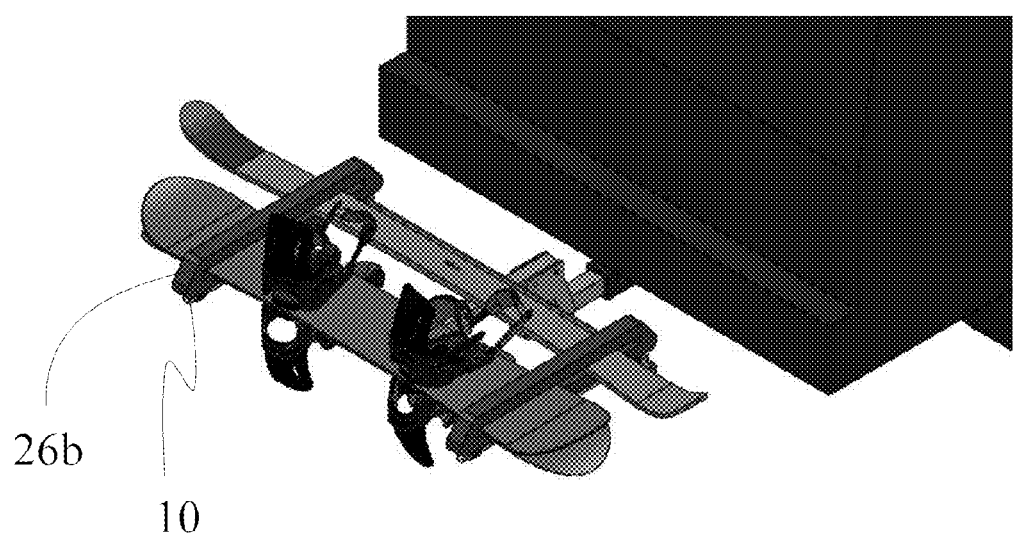
FIG. 3 is an isometric view of the invention showing the device mounted on a vehicle with two different special purpose sporting equipment carriers (in this case, for skis and snowboards) mounted on the standardized load bars of the invention.

FIG. 3 is an isometric view of the invention showing the device mounted on a vehicle with two entirely different special purpose sporting equipment carriers 26b (in this case, for skis and snowboards) mounted on the standardized load bars 10 of the invention. Thus it may be seen that the wide variety of special load carrying equipment already on the market, such as carriers 26 and 26b, may be used.

Note that the standardized load bars 10 would normally be atop the vehicle and would normally be perpendicular to the axis of the vehicle. That prior art configuration makes sense on top of the vehicle but is counter-productive behind the vehicle. The present invention's orientation allows sporting equipment and its specialized carriers to be mounted perpendicular (transverse) to the axis of the vehicle and mount 18.

Figure 4:
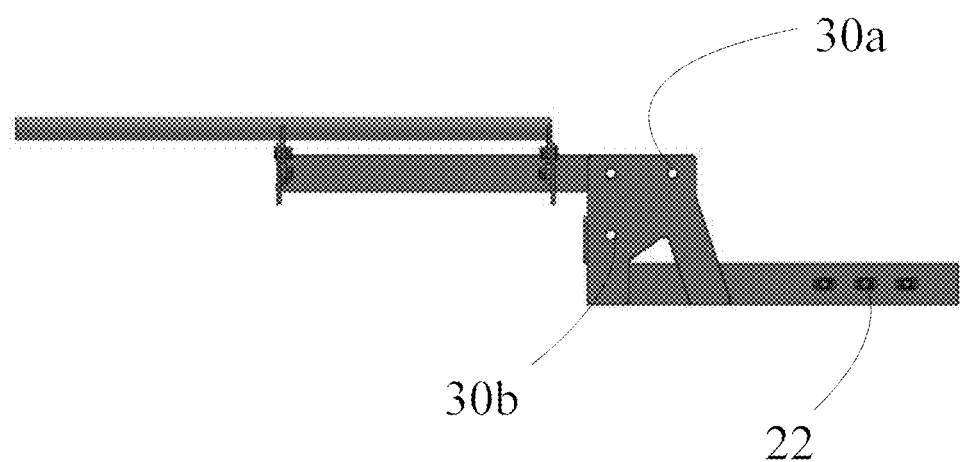
FIG. 4 is a side view of the invention.

FIG. 4 is a side view of the invention. Plural swivel pin connection points 30a and 30b allow the rack part of the device to swing to a plurality of different positions, vertical, horizontal and below horizontal (discussed further below in reference to FIG. 12).

Figure 5:
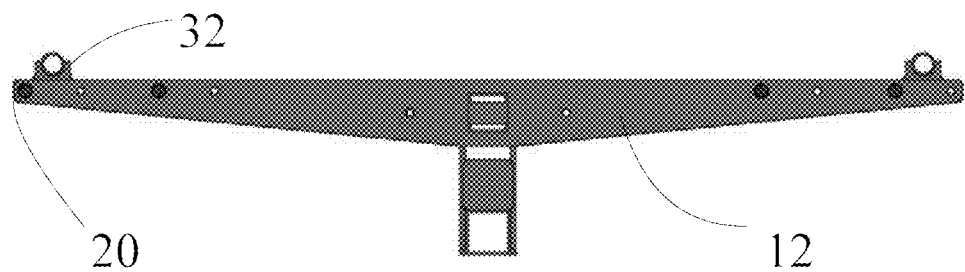
FIGS. 5 and 5B are respectively rear view and partial perspective rear view of the invention, showing the load bar quick connect.
Figure 5B:
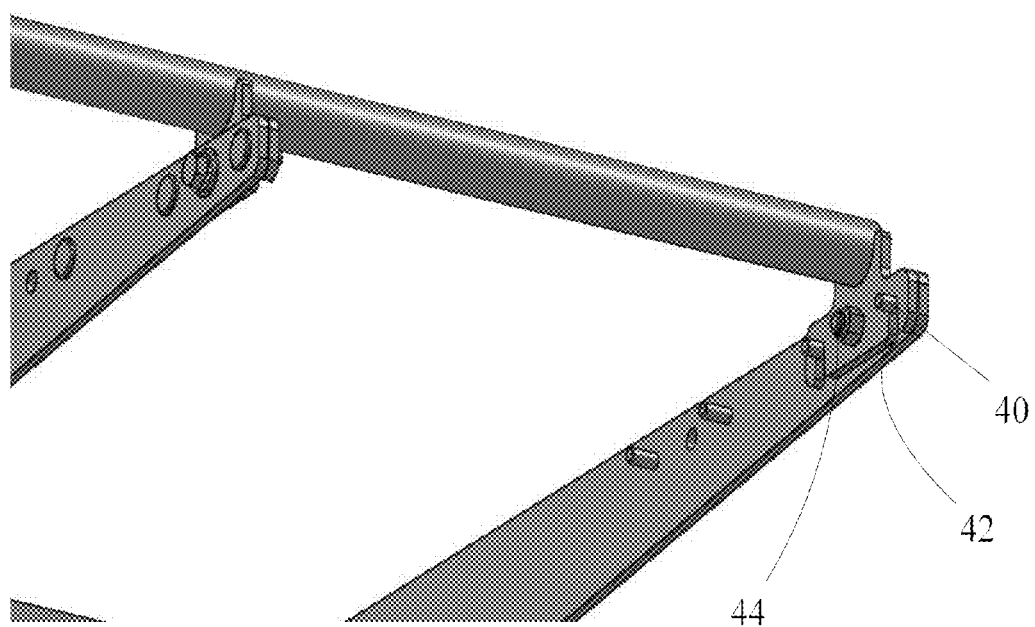

FIG. 5 is is a rear view of the invention, showing the load bar collar 32 used to secure the standardized load bar (seen only in cross-section as a circle) to the secondary rack member 12 and FIG. 5B shows the quick connect with parts 40, 42 and relevant parts 32 and 44. By switching connect/bars 32 and 10 for the same device with a rectangular cross section, standardized rectangular cross sectional load bars can be employed and the invention may switch between the two types of load bars easily. Similarly, the invention can be switched between numerous other types of load bars as well. A load bar quick connection comprises a post 40 which slides into a slot 42, with a single nut and bolt 44 for lateral loads and negative g-forces experienced when a vehicle goes over a bump, decelerates, maneuvers and so on. One load bar quick connection is present at each end of each standardized load bar 10, in the preferred embodiment, though the invention is not so limited.

Figure 6:
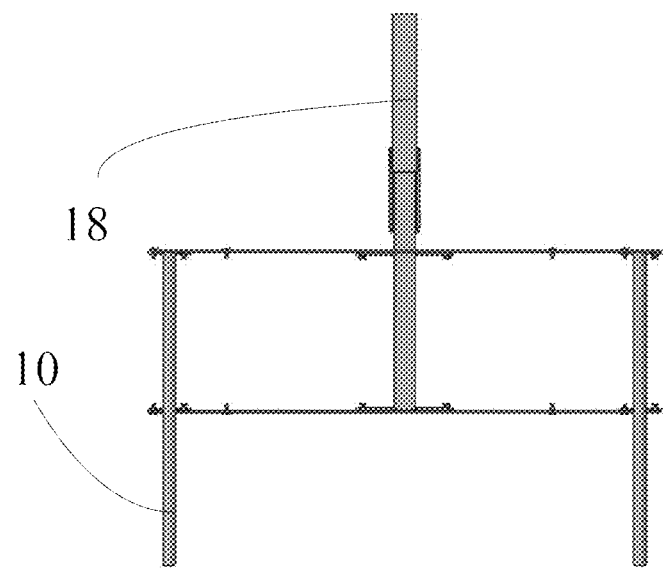
FIG. 6 is a top view of the invention.

FIG. 6 is a top view of the invention. In planform, it becomes quite clear that the load bars 10 are parallel to the mount 18 and to the axis of the vehicle.

Figure 7:
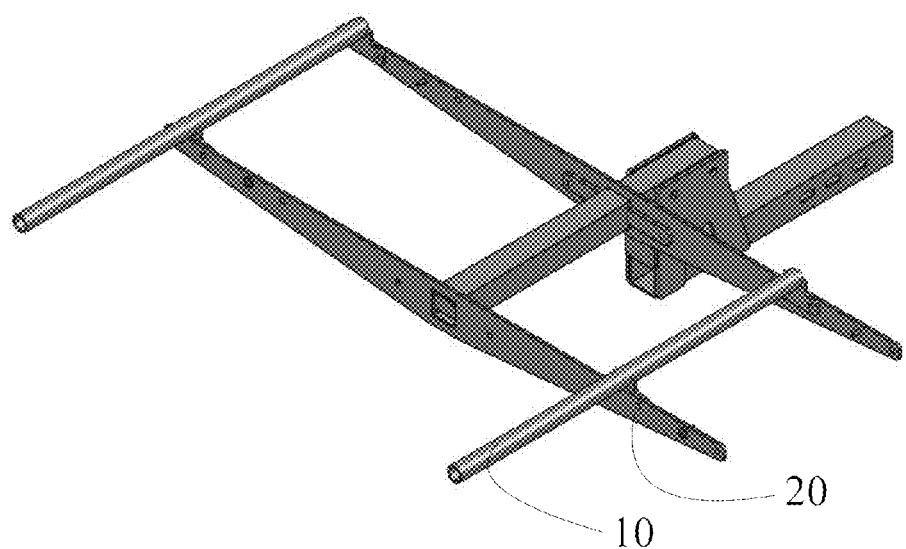
FIG. 7 is an isometric view of the invention showing the standardized load bars located at a different distance apart compared to FIGS. 1 through 6, in this case, with the bars in a non-symmetrical configuration.
Figure 8:
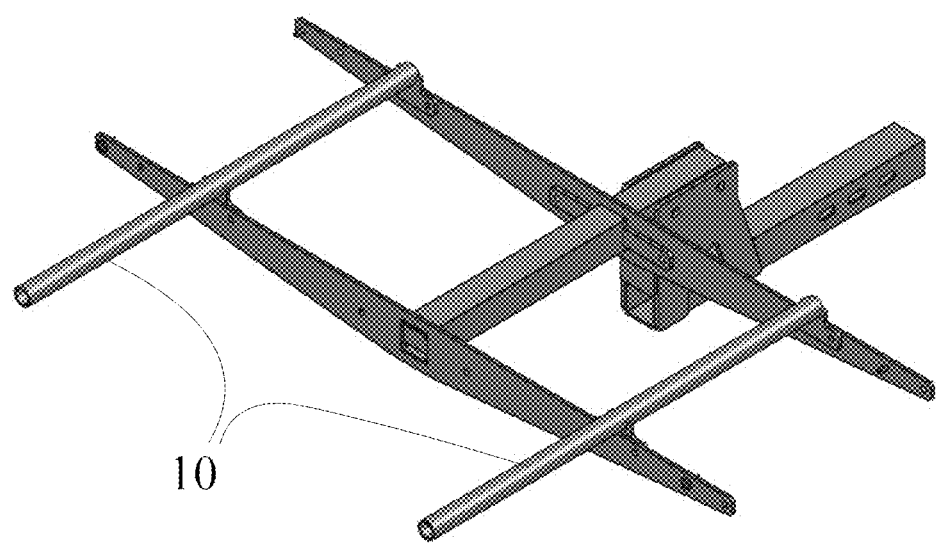
FIG. 8 is an isometric view of the invention showing the standardized load bars located at a third distance apart compared to FIG. 7 and to FIGS. 1 through 6.

FIG. 7 is an isometric view of the invention showing the standardized load bars located at a different distance apart compared to FIGS. 1 through 6, in this case, with the bars in a non-symmetrical configuration. In this case, an alternate connection point 20 is used, thus changing the distance between the load bars 10. FIG. 8 is an isometric view of the invention showing the standardized load bars located at a third distance apart compared to FIG. 7 and to FIGS. 1 through 6, in this case, a symmetrical configuration with the bars equidistant from the main rack member.

Figure 9:
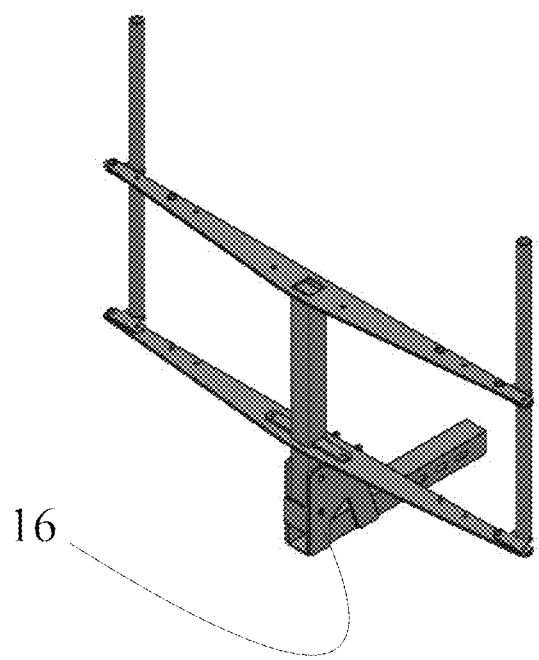
FIG. 9 is a view of the invention folded.

FIG. 9 is a view of the invention folded. Folding up the invention further reduces space required for the invention.

Figure 10:
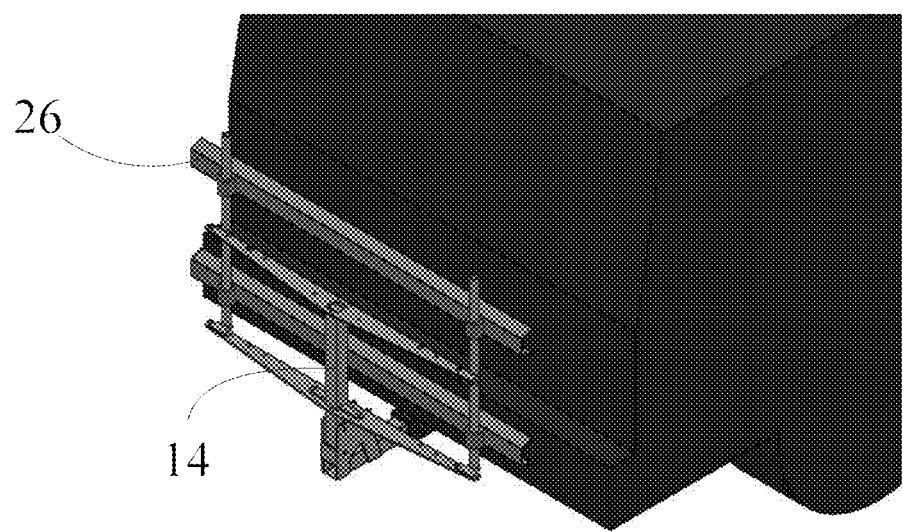
FIG. 10 is a view of the invention folded in a position for transport, and with special purpose sporting equipment carriers for bicycles mounted, although in the folded position carrying bicycles is impossible.
Figure 11:
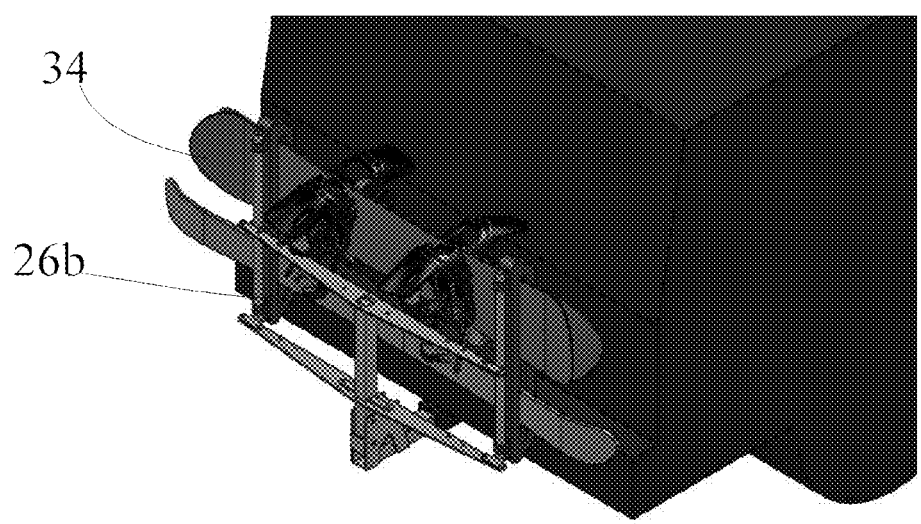
FIG. 11 is a view of the invention folded in a position for transport, and with special purpose sporting equipment carriers for ski/snowboard equipment mounted, showing that in the folded position carrying such equipment is possible.

FIG. 10 is a view of the invention folded in a position for transport, and with special purpose sporting equipment carriers for bicycles mounted, although in the folded position carrying bicycles is impossible. However, FIG. 11 is a view of the invention folded in a position for transport, and with special purpose sporting equipment carriers 26b for ski/ snowboard equipment 34 mounted, showing that in the folded position carrying such equipment is possible.

Figure 12:
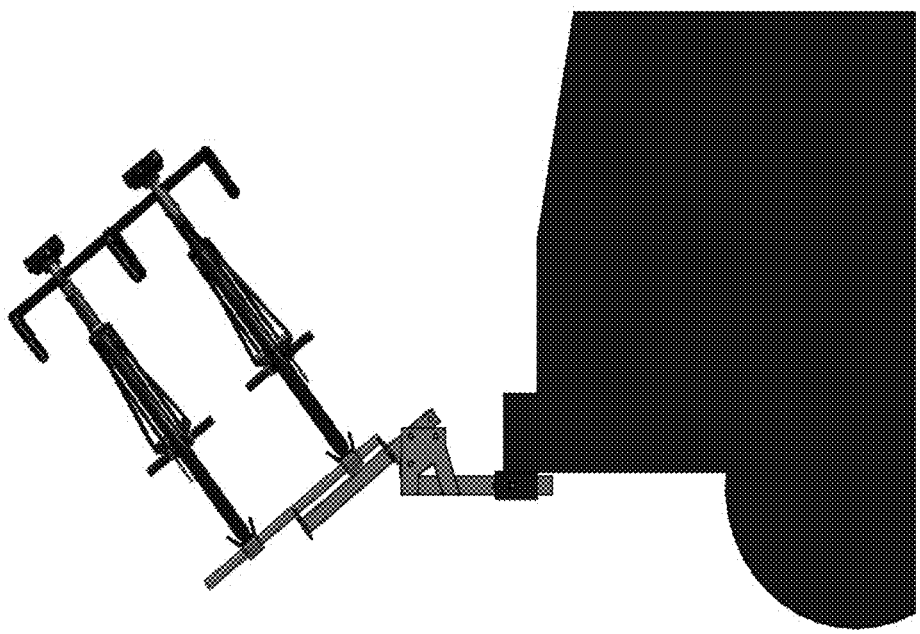
FIG. 12 is a side view showing the third position of the invention.

FIG. 12 shows that the invention has a third position which is actually just below the horizontal. While this position may make loading and unloading easier, it is primarily found that this position aids in allowing the vehicle rear gate/hatch/spare tire/etc to be opened or swung without removing the invention. Thus under some circumstances the present invention can not only replace a roof rack but can even replace the prior art inventions of the type shown in FIG. 13.

Figure 13:
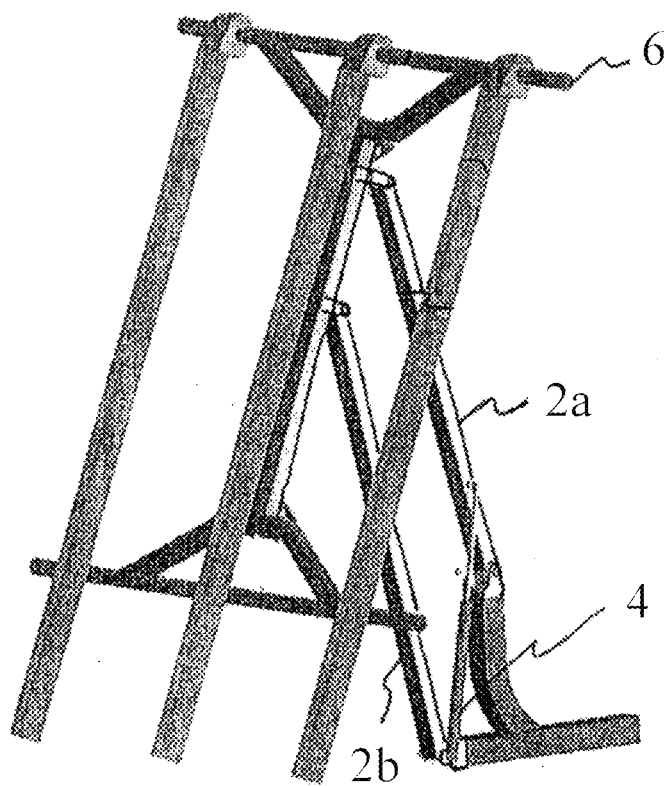
FIG. 13 is a view of a PRIOR ART device, showing that the support frame has two vertical members and a gas cylinder not required by the present invention and furthermore showing that the orientation of the crossbars is the same as that of such bars mounted on the roof of a vehicle, that is, perpendicular to the receiver and the axis of the vehicle.

FIG. 13 is a view of a PRIOR ART device, showing that the support frame has two vertical members 2*a*, 2*b* and a gas cylinder 4 not required by the present invention and furthermore showing that the orientation of the crossbars 6 is the same as that of such bars mounted on the roof of a vehicle, that is, perpendicular to the receiver and the axis of the vehicle.

FIG. 14 is an isometric view of an alternative preferred embodiment of the invention, showing the invention in a position of usage, without special purpose sporting equipment carriers, and with the standardized load bars tilted so that the outer bar on each side is higher than the inner bar.

Standardized load bars 110 are as discussed below in relation to "Example of Use". However, in general commercially successful and widely used load bars of various sizes and shapes are defined to be standard. It will be seen that load bars 110 have a U shaped planform, with inner bar 152 and outer bar 110. These are connected by the end of the rack 150, in effect a cross-member.

Secondary rack members 112 may be any solid beam construction. In the FIG. 14, these may be box-beam construction, however, they may also be C-beam construction and so on.

Main rack member 114 is much as discussed previously in regard to main rack member 14.

Swivel/pivot plates 116 on both sides of the main rack member front end connect and secure the main rack member 114 to the mount/main member 118.

Hitch bolt (mount to vehicle connection points) 122 (seen in FIG. 2) secures the mount to the receiver of the vehicle (not shown in FIG. 14 or 15).

FIG. 15 is an isometric view of the alternative preferred embodiment of the invention, with the standardized load bars tilted so that the inner bar on each side is higher than the outer bar. FIGS. 14 and 15 should be compared carefully to see the difference, which will be explained further in relation to FIGS. 19 and 20.

Figure 16:
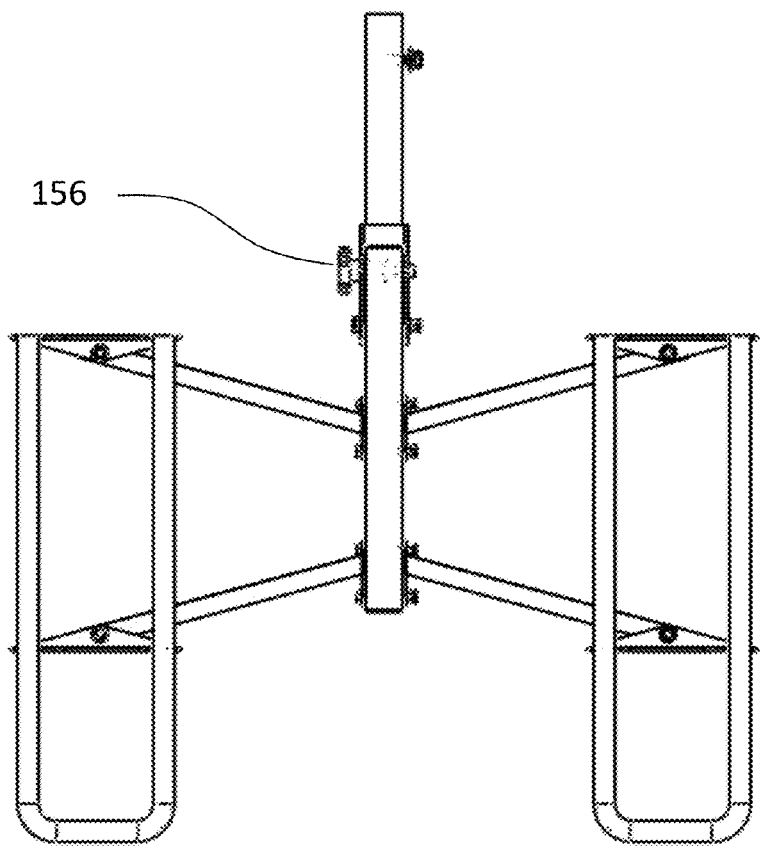
FIG. 16 is a top view of the alternative preferred embodiment of the invention.

FIG. 16 is a top view of the alternative preferred embodiment of the invention.

Adjustment knob 156 may be seen projecting out one side, with an extension seen projecting through the main rack member and out the other side, through the pivot plates on both sides.

Figure 17:
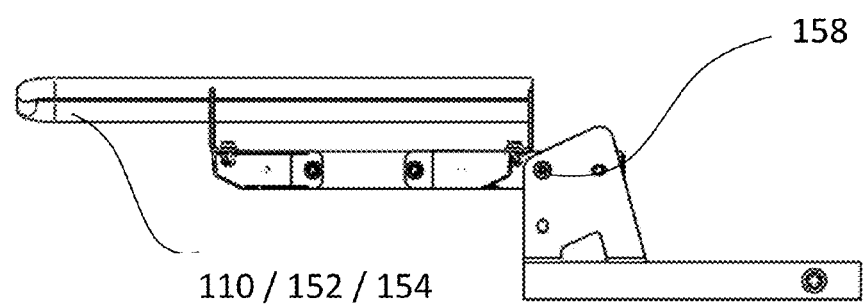
FIG. 17 is a right side view of the same embodiment, with the standardized load bars tilted outer part higher.

FIG. 17 is a right side view of the same embodiment, with the standardized load bars tilted outer part higher.

Swivel shaft/bolt 158 may be seen to be the exact point at which rotation of the main rack member (and all objects secured thereto) may occur in relation to the mount, the receiver and the vehicle.

Figure 18:
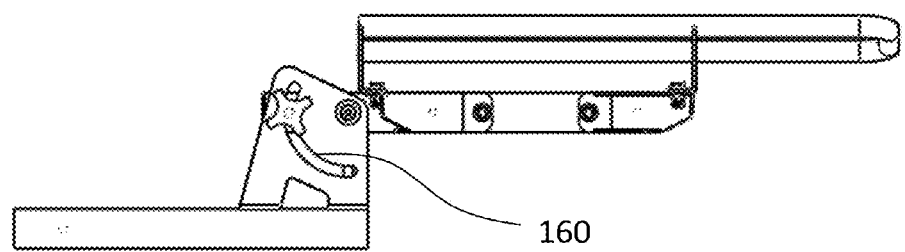
FIG. 18 is a left side view of the same embodiment, showing the alternative means of angling the rack from orientations past the vertical to orientations past the horizontal.

FIG. 18 is a left side view of the same embodiment, showing the alternative means of angling the rack from orientations past the vertical to orientations past the horizontal.

Adjustment race 160 is the aperture, arcuate in shape as depicted, in which the extension of adjustment knob 156 may be moved.

The adjustment knob has a first, tight position in which no rotation is possible and a second, tight position in which the main rack member can rotate and thus be placed in any of the three main positions (vertical, horizontal, or below horizontal).

Figure 19:
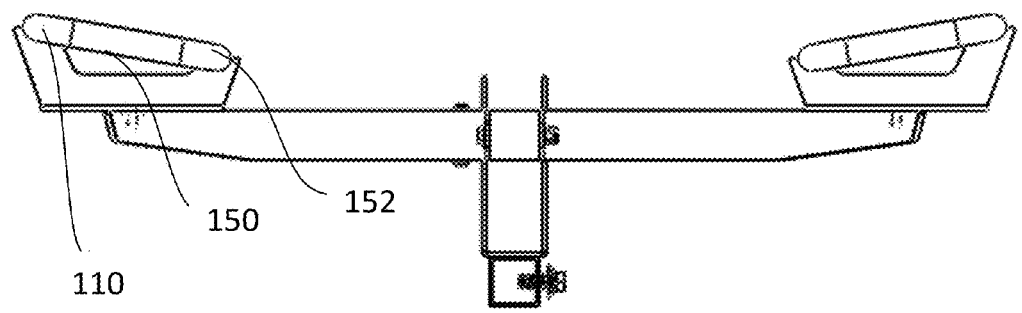
FIG. 19 is an end view of the same embodiment, showing the load bars tilted outer side higher.
Figure 20:
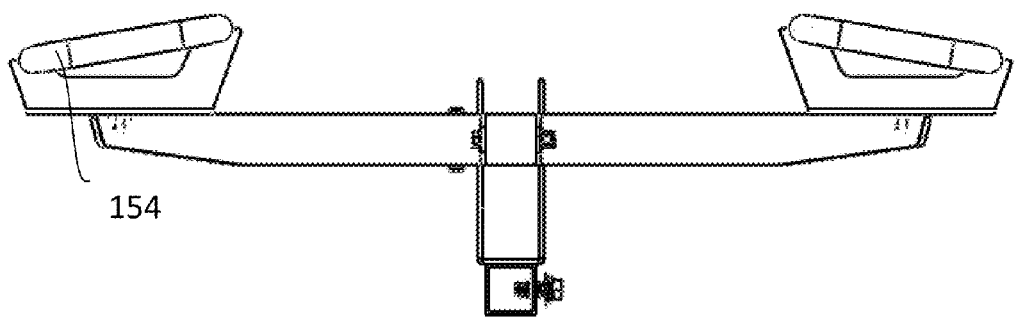
FIG. 20 is an end view of the same embodiment, showing the load bars tilted inner side higher.

FIG. 19 is an end view of the same embodiment, showing the load bars tilted outer side higher, while FIG. 20 is an end view of the same embodiment, showing the load bars tilted inner side higher.

The mechanism by which this is achieved may now be seen clearly. Each quick disconnect connector between the bars and the secondary members has a central part which is attached to the secondary rack members. Each also has two legs extending upward, the legs being of different lengths. When the longer leg is to the outside, the outer part of the bar (110) will be higher than the inner part 152, while when the longer leg is to the inside, the inner part 152 will be higher.

Figure 21:
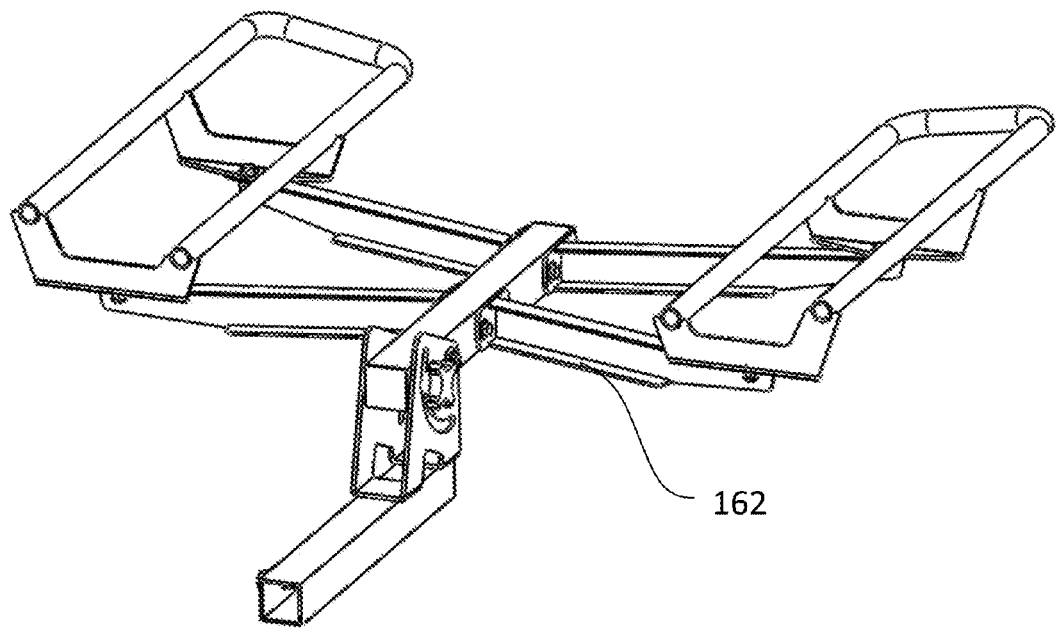
FIG. 21 is an isometric view of the same embodiment showing the construction of the secondary rack members, with a first tilt of the load bars.
Figure 22:
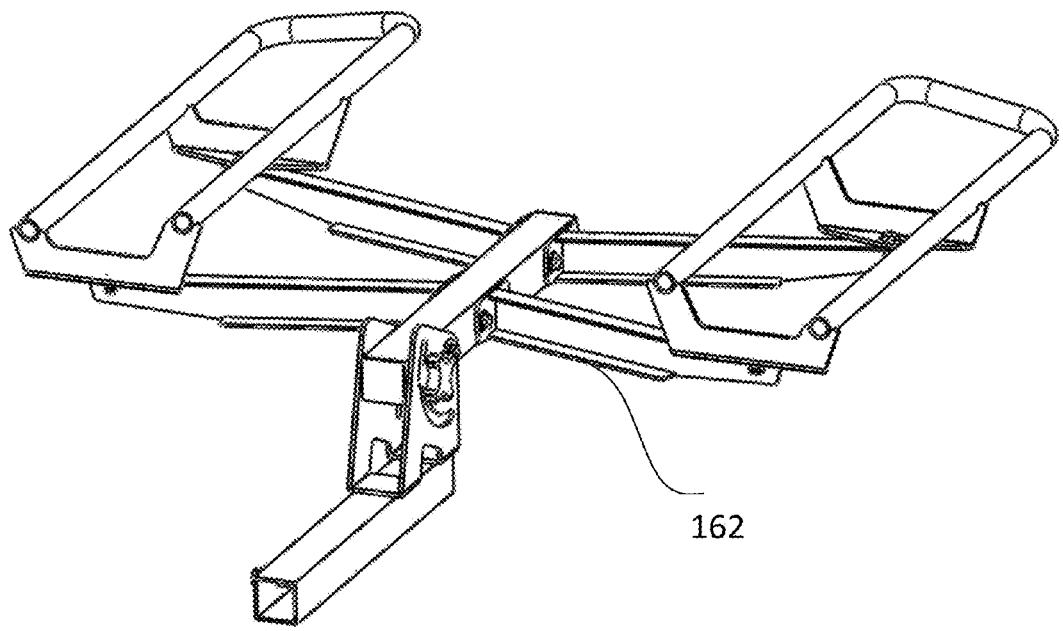
FIG. 22 is an isometric view of the same embodiment showing the construction of the secondary rack members, with a second tilt of the load bars.

FIG. 21 is an isometric view of the same embodiment showing the construction of the secondary rack members, with a first tilt of the load bars. FIG. 22 is an isometric view of the same embodiment showing the construction of the secondary rack members, with a second tilt of the load bars. Flange 162 (which forms a C-beam in this case rather than a box beam) provides not just additional support, strength and lateral stability, it is important in that it provides a flat top to the secondary support. This flat top is important as it will help prevent injury to individuals falling onto the member, and will help prevent damage to sporting equipment which is very prone to bumping objects below it while being stowed or unloaded.

Figure 23:
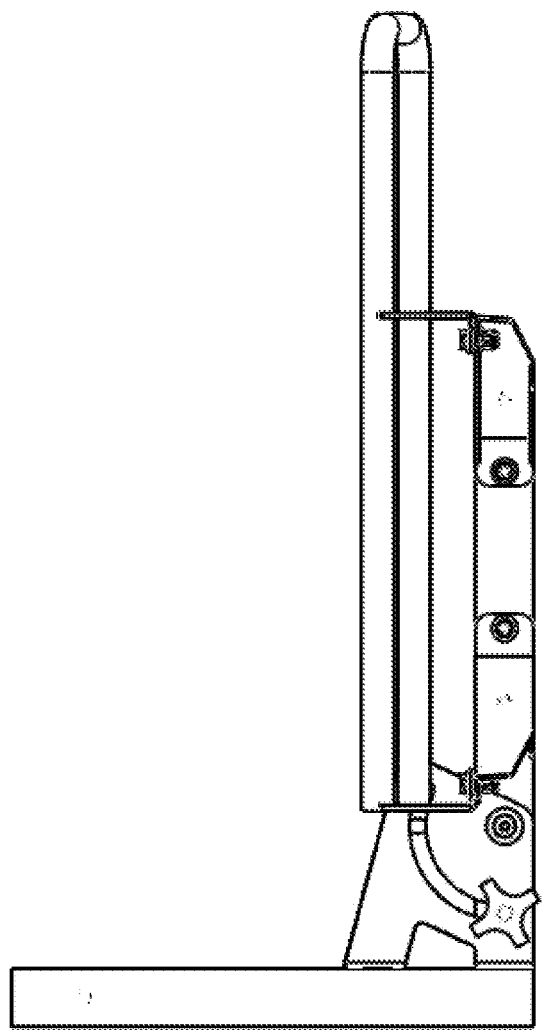
FIG. 23 is a side view of the invention in the folded or vertical position. In all further drawings it will be assumed without comment that the swivel may be arranged on either side.

FIG. 23 is a side view of the invention in the folded or vertical position, but having the adjustment knob positioned on the right side rather than the left side. In all further drawings it will be assumed without comment that the swivel may be arranged on either side.

Figure 24:
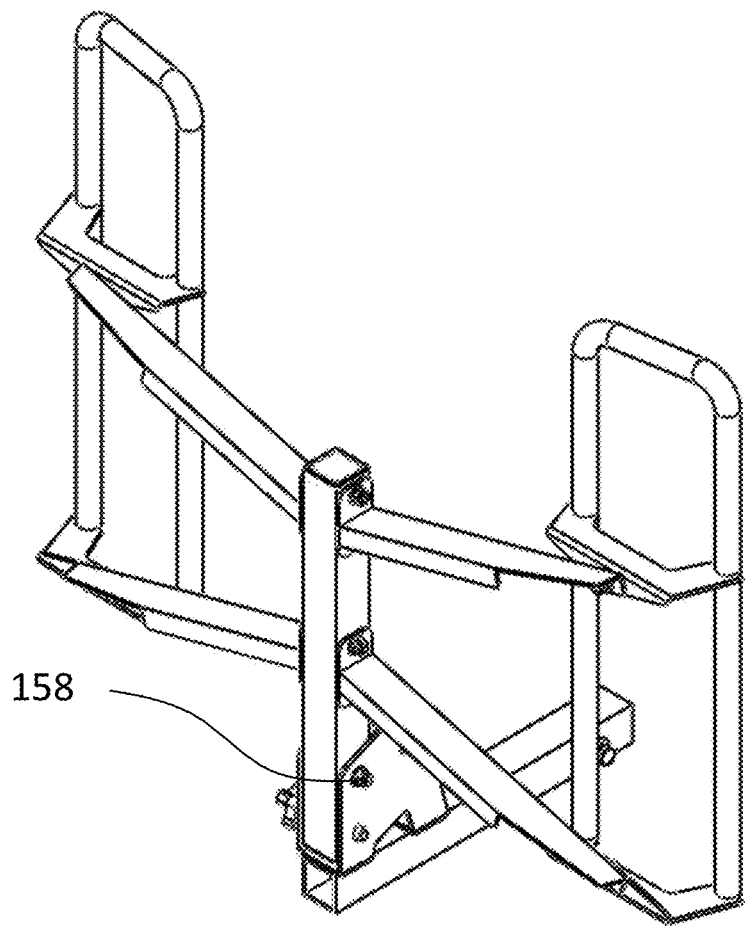
FIG. 24 is an isometric view of the invention in the vertical position.
Figure 25:
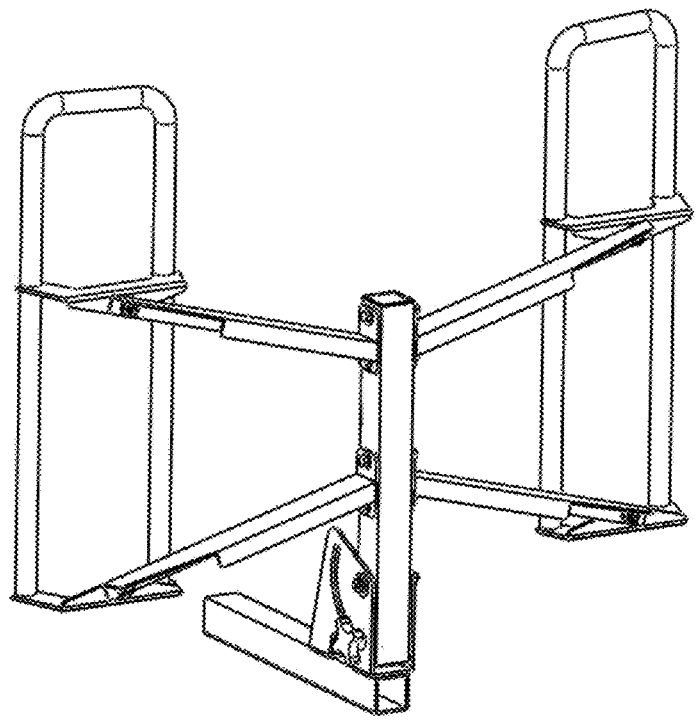
FIG. 25 is an isometric view of the invention in the vertical position, showing further details of the swivel/pivot plates, adjustment knob, etc.

FIG. 24 is an isometric view of the invention in the vertical position. FIG. 25 is an isometric view of the invention in the vertical position, showing further details of the swivel/pivot plates, adjustment knob, etc.

Obviously, in the vertical position the device is largely in the slipstream of the vehicle and it saves fuel, not to mention being much shorter than when extended and thus safer.

Figure 26:
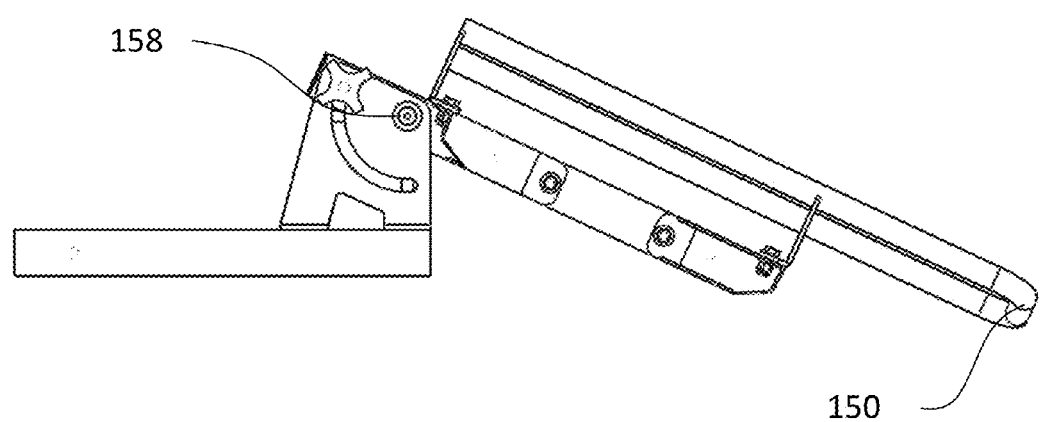
FIG. 26 is a side view of the invention showing that the rack of the invention can tilt downward below the horizontal and thus below the level of the hitch, whereby access to the back of the vehicle is facilitated when the rack is loaded.

FIG. 26 is a side view of the invention showing that the rack of the invention can tilt downward below the horizontal and thus below the level of the hitch, whereby loading of the device with sporting equipment may be facilitated. This position greatly facilitates opening the rear hatch or other equipment of the vehicle even when sporting equipment is in transport. As can be seen, bar end 150 is notably lower than the mount due to being swiveled about the pivot bolt 158. This is a marked advantage of the device over prior art.

Figure 27:
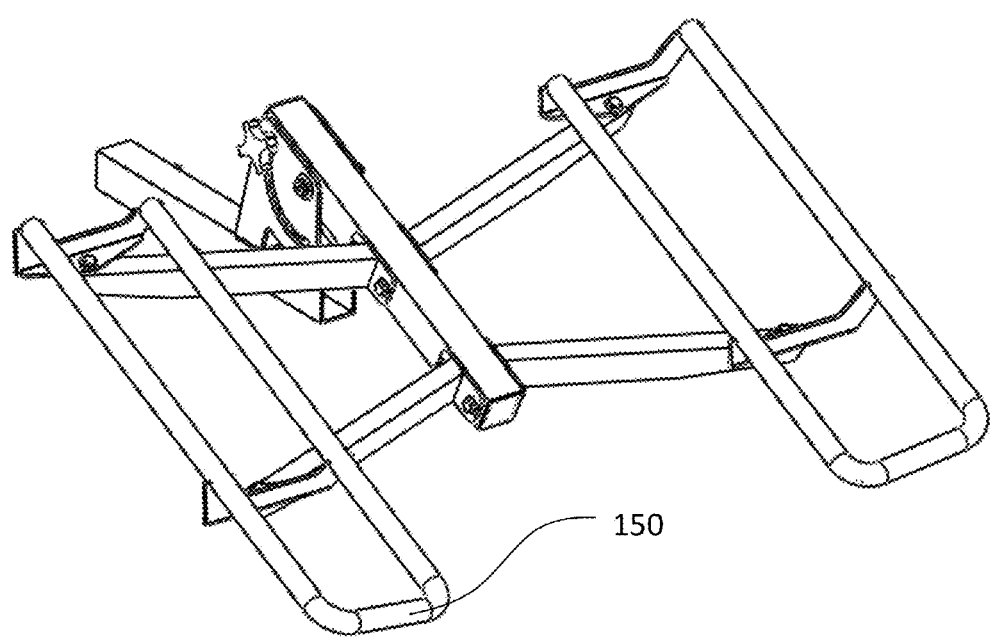
FIG. 27 is an isometric view of the invention with the end of the load bars depressed below the horizontal.

FIG. 27 is an isometric view of the invention with the end of the load bars depressed below the horizontal, showing this same feature from a different angle.

Figure 28:
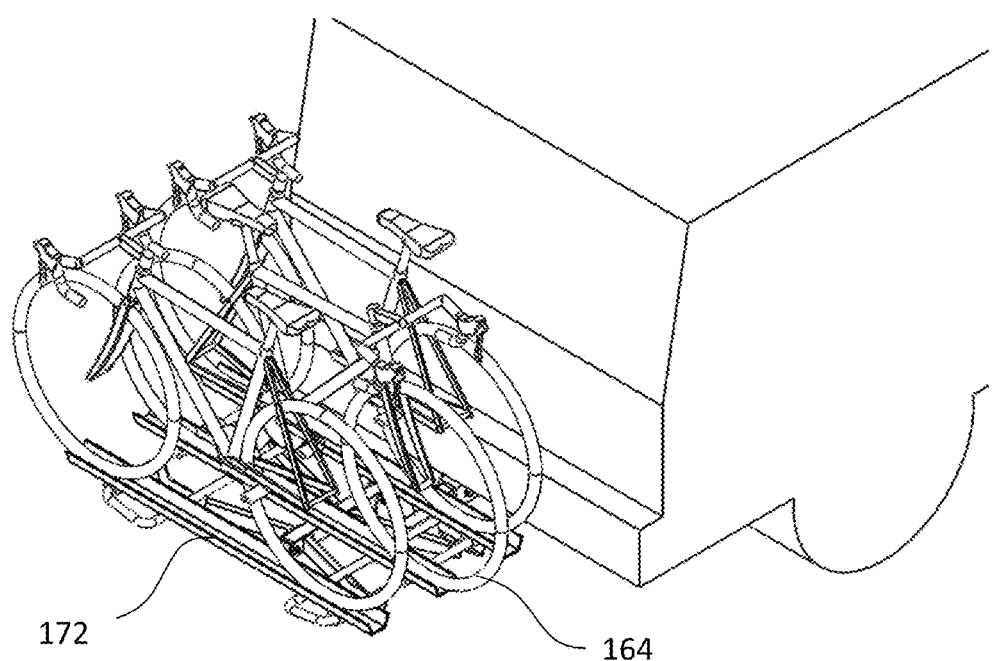
FIG. 28 is an isometric view showing the invention loaded, in this case with bicycle upon accessory special purpose sporting equipment carriers.

FIG. 28 is an isometric view showing the invention loaded, in this case with bicycles upon special purpose sporting equipment carriers. Bicycle 164 sits on bicycle accessory rack 172 which is attached to the standard load bars 110 (not marked for clarity on this diagram).

By this means, a user can purchase standard bicycle racks for any standard, widespread brand of roof racks now known or later devised (such as bicycle racks for THULE® brand roof racks) and need not confine themselves to purchasing all their accessory racks from a single company.

Figure 29:
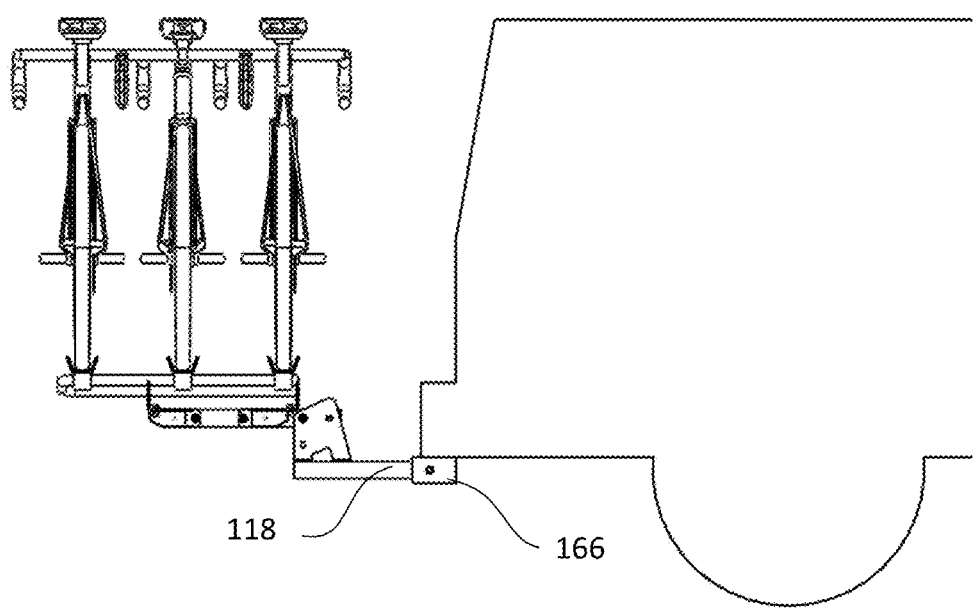
FIG. 29 is a side view of the invention in the alternative preferred embodiment of aluminum, showing the relationship of vehicle, hitch, main support member, and sporting equipment.

FIG. 29 is a side view of the invention in the alternative preferred embodiment of aluminum, showing the relationship of vehicle, hitch, main support member, and sporting equipment. Trailer hitch of vehicle (166) is normally the lowest point of the end of the vehicle.

Figure 30:
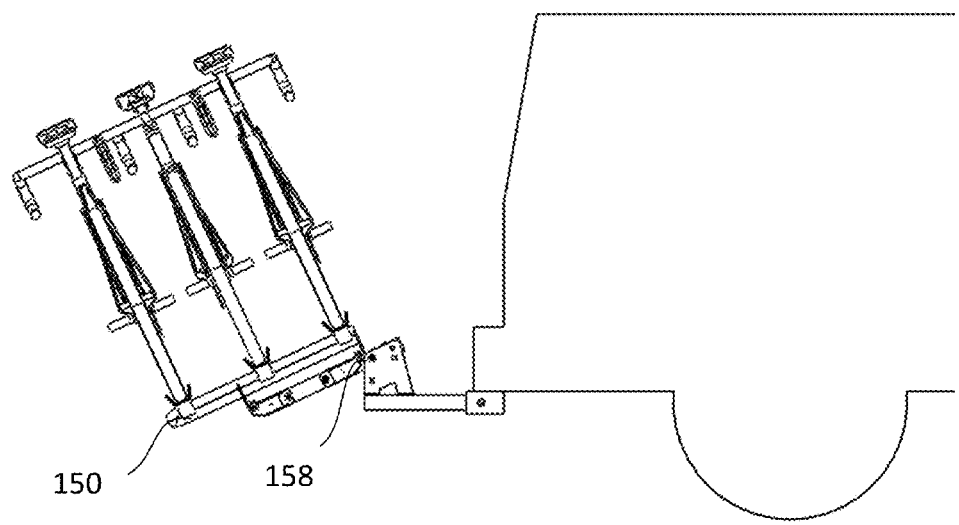
FIG. 30 is a side view of the invention embodiment, showing the relationship of vehicle, hitch and sporting equipment when the device is lowered below the horizontal.

However, FIG. 30 is a side view of the invention embodiment, showing the relationship of vehicle, hitch and sporting equipment when the device is lowered below the horizontal. Now the bar end 150 is noticeably lower and thus may be easier to access depending upon conditions and more importantly, allows access to the back of the vehicle when the rack is loaded. The rotation has been accomplished at pivot bolt 158.

Figure 31:
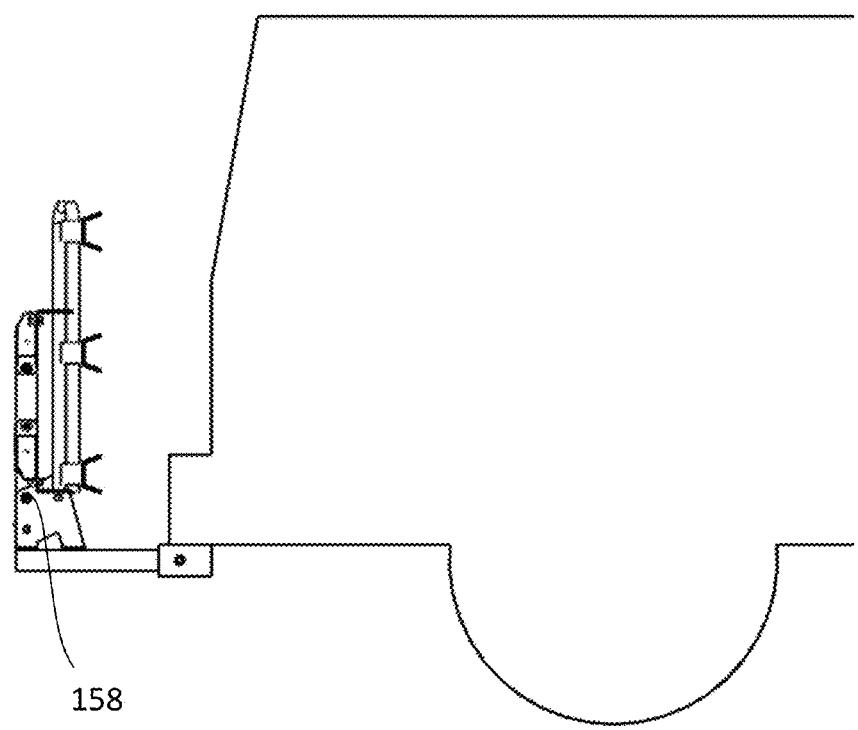
FIG. 31 is a side view of the invention, with the accessory still mounted and the bicycles removed, in the vertical (stowed) position.

FIG. 31 is a side view of the invention, with the accessory still mounted and the bicycles removed, in the vertical (stowed) position. Again pivot bolt 158 allows the change to suit the lack of mounted bicycles.

Figure 32:
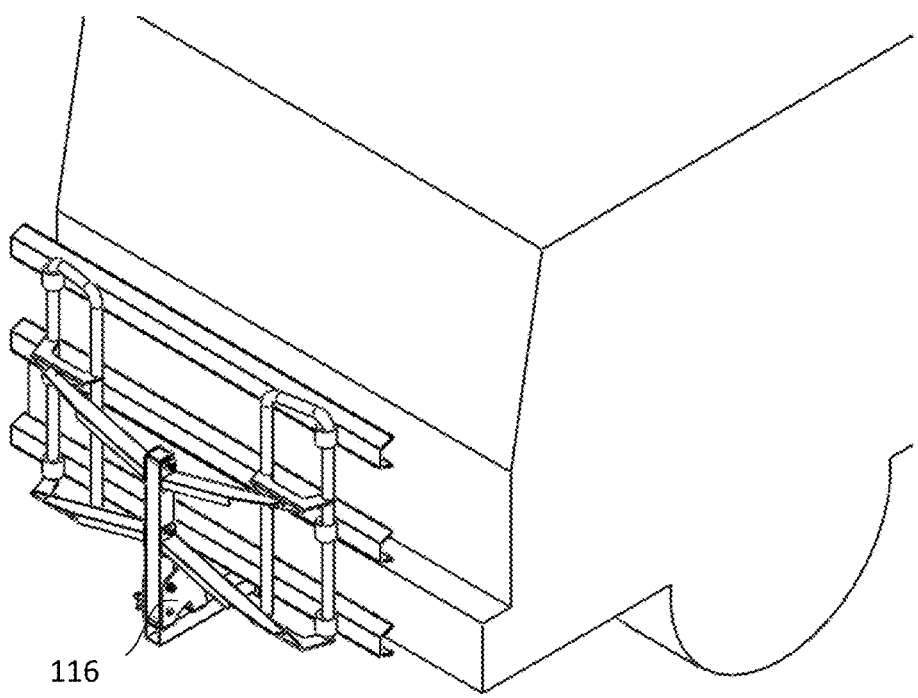
FIG. 32 is an isometric view of the embodiment, showing the same accessory racks mounted and stowed.

FIG. 32 is an isometric view of the embodiment, showing the same accessory racks mounted and stowed. Pivot plate 116 may be seen through the members and accessory racks of the invention.

Figure 33:
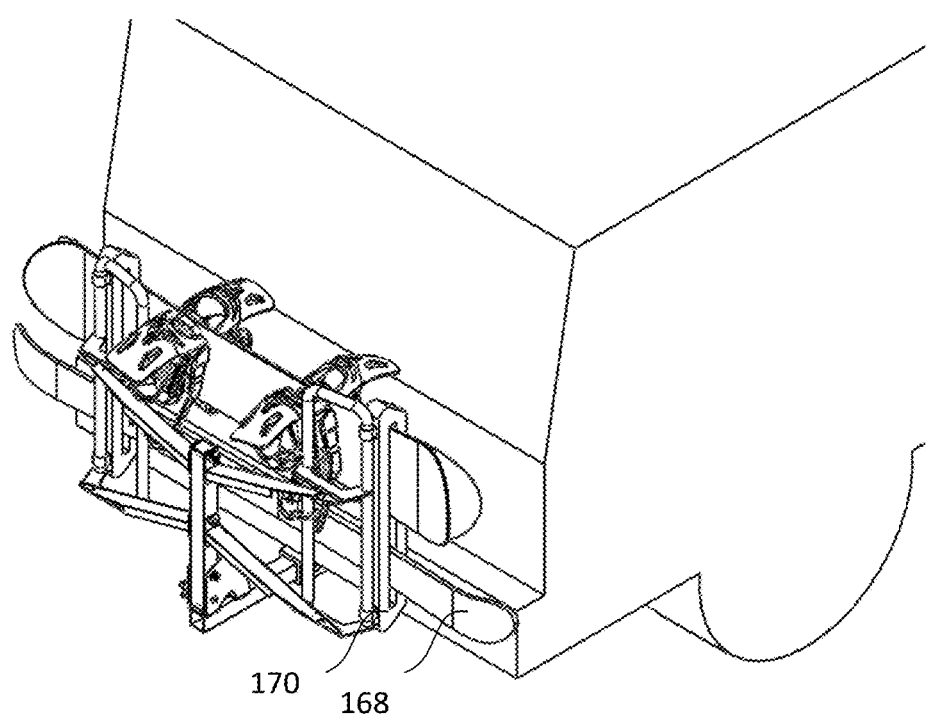
FIG. 33 however is an isometric view of the embodiment, showing a different set of accessory racks mounted, this time for holding snow boards and skis, and with the sporting equipment in the racks, but showing that the rack can be vertical even when in use with some types of equipment.

FIG. 33 however is an isometric view of the embodiment, showing a different set of accessory racks mounted, this time for holding snow boards and skis, and with the sporting equipment in the racks, but showing that the rack can be vertical even when in use with some types of equipment. Snowboard 168 is substantially flat and is mounted in ski accessory rack (snowboard rack) 170. It may be seen that the device is in the "stowed" position even for transport.

Figure 34:
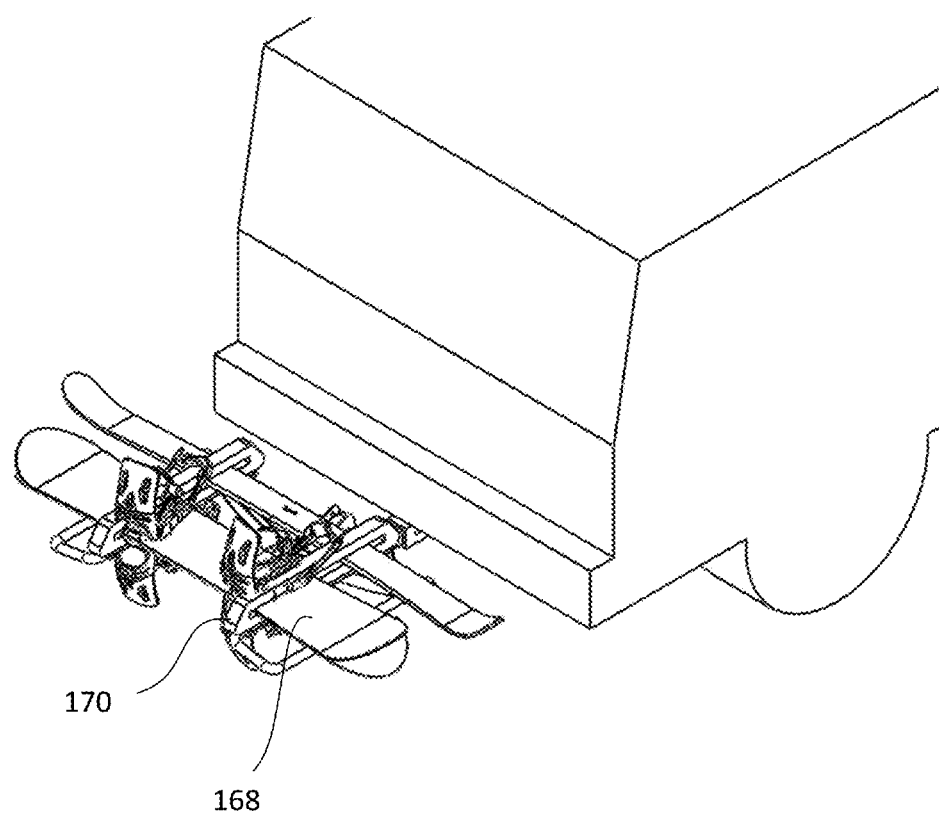
FIG. 34 is an isometric view of the same arrangement however with the rack lowered.

FIG. 34 is an isometric view of the same arrangement however with the rack lowered to the horizontal position. This might be employed if for example loaded ski rack blocked the tail lights of the vehicle.

Figure 35:
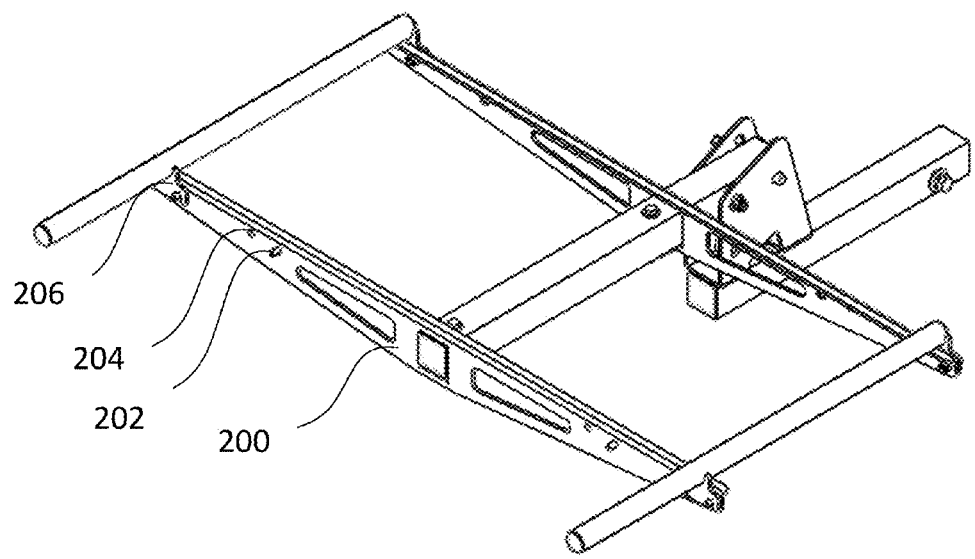
FIG. 35 is an isometric view of yet another alternative preferred embodiment of the invention, this time partially or wholly in steel material, having different secondary rack members, and importantly, having provision, as discussed in the first embodiment, for moving standardized load bars inward and outward on the secondary rack members.

FIG. 35 is an isometric view of yet another alternative preferred embodiment of the invention, this time partially or wholly in steel material, having different secondary rack members, and importantly, having provision, as discussed in the first embodiment, for moving standardized load bars inward and outward on the secondary rack members.

Secondary rack member 200 is flat, although also flanged on the top, is straight, and is perpendicular to the main rack member. Thus it is in ways more similar to the embodiment of FIGS. 1 through 12.

Post 202 may be seen near hole 204. Load bar connection 206 (load bar quick connection or quick disconnect are alternative names used herein) may secure load bar 210 (see FIG. 37) to secondary rack member 200.

Figure 36:
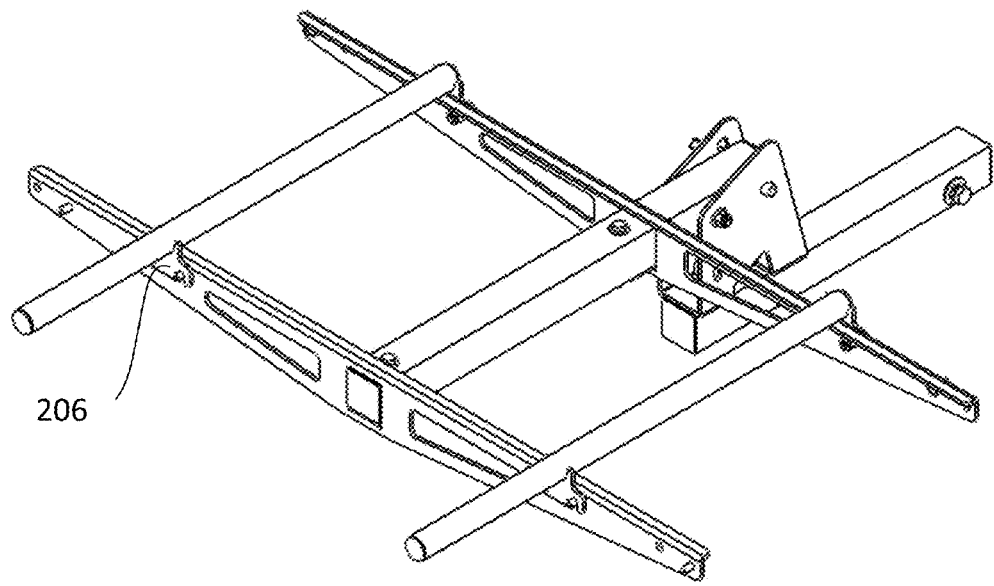
FIG. 36 is an isometric view of the same embodiment, in this case with the bars moved inward.

FIG. 36 is an isometric view of the same embodiment, in this case with the bars moved inward. Load bar connection 206 has been moved to the inner set of post/hole 202/204 (FIG. 35). Note that the hole and post are dimensioned and configured to align with a matching hole and slot on the connection 206. The slot, as may be seen, is open to the bottom, so the bar rests upon it when in use.

Figure 37:
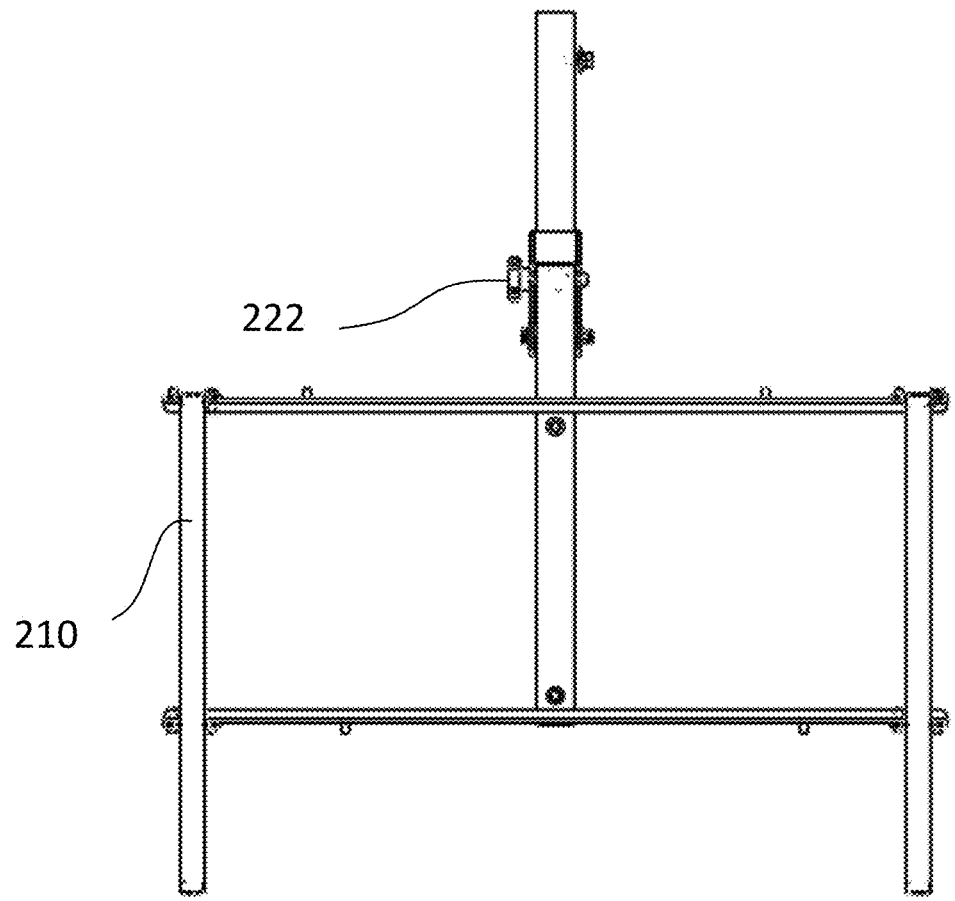
FIG. 37 is a top view of the additional alternative preferred embodiment of the invention, with the standardized load bars placed near the ends of the secondary rack members.

FIG. 37 is a top view of the additional alternative preferred embodiment of the invention, with the standardized load bars placed near the ends of the secondary rack members.

Adjustment knob 222 may be seen on the side of the device, as discussed previously in regard to adjustment knob 158.

Figure 38:
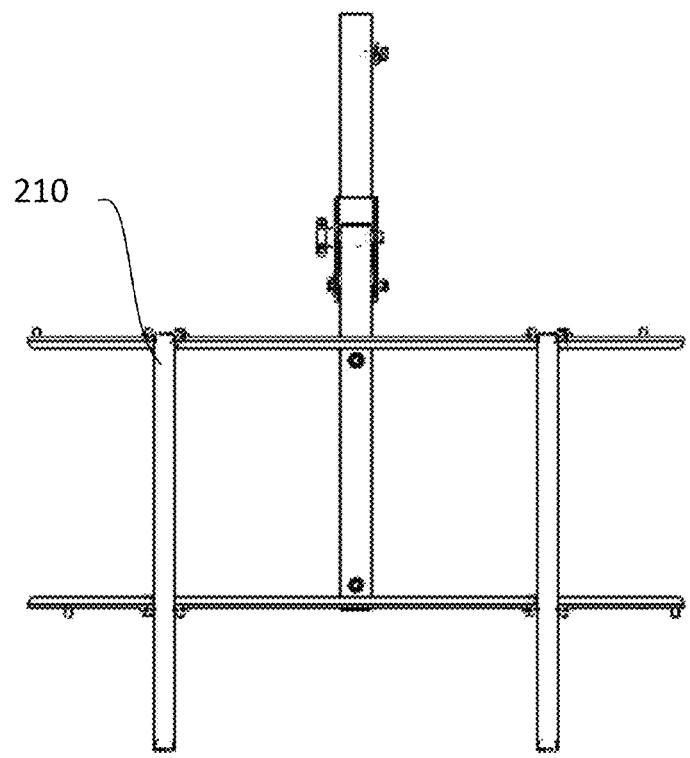
FIG. 38 is a top view of the additional alternative preferred embodiment of the invention, with the standardized load bars placed inward.

FIG. 38 is a top view of the additional alternative preferred embodiment of the invention, with the standardized load bars placed inward. Note that as discussed previously, one may be placed inward and one outward, so with 4 locations for posts/holes, 3 different distances between the load bars 210 may be achieved. The invention is not limited to 4 locations, in embodiments with more locations, more distances may be achieved for the separation between the load bars.

Figure 39:
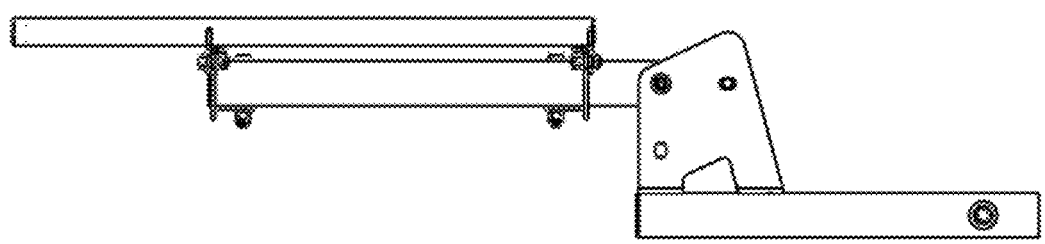
FIG. 39 is a side view of the embodiment of the invention in the horizontal orientation, without accessory equipment.
Figure 40:
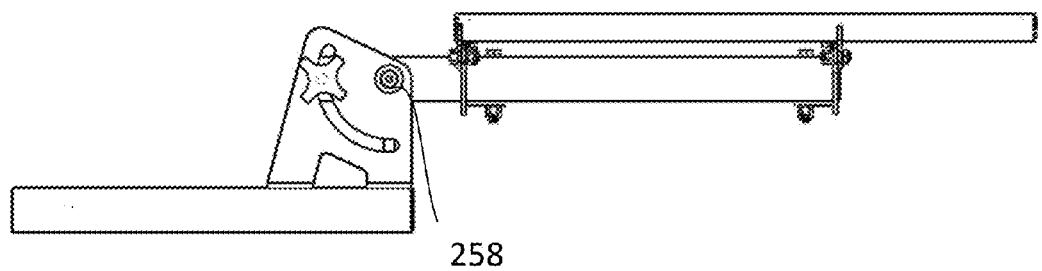
FIG. 40 is a side view of the embodiment of the invention in the horizontal orientation.

FIG. 39 is a side view of the embodiment of the invention in the horizontal orientation, without accessory equipment, and FIG. 40 is a reverse side view of the embodiment of the invention in the horizontal orientation. The adjustment knob, race and pivot bolt may all be seen.

Figure 41:
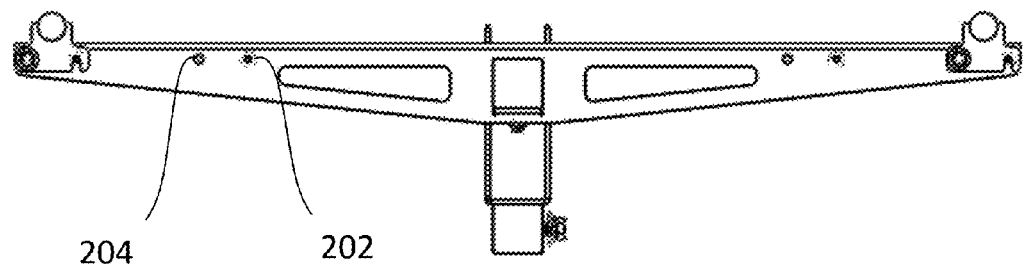
FIG. 41 is an end view of the embodiment of the invention horizontal, without accessories, and showing the arrangements used to secure the standardized load bars to the secondary rack members.

FIG. 41 is an end view of the embodiment of the invention horizontal, without accessories, and showing the arrangements used to secure the standardized load bars to the secondary rack members. In this case the load bars are on the outboard pins and holes.

Figure 42:
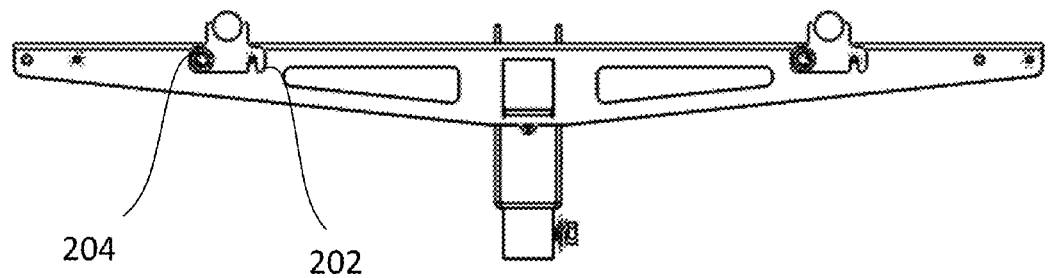
FIG. 42 is an end view of the embodiment of the invention horizontal, without accessories, and showing the arrangements used to secure the standardized load bars to the secondary rack members in another position.

FIG. 42 is an end view of the embodiment of the invention horizontal, without accessories, and showing the arrangements used to secure the standardized load bars to the secondary rack members in another position. In this diagram the load bars, by means of the connectors 206 (see FIG. 43), are on the inner post/hole sets.

Figure 43:
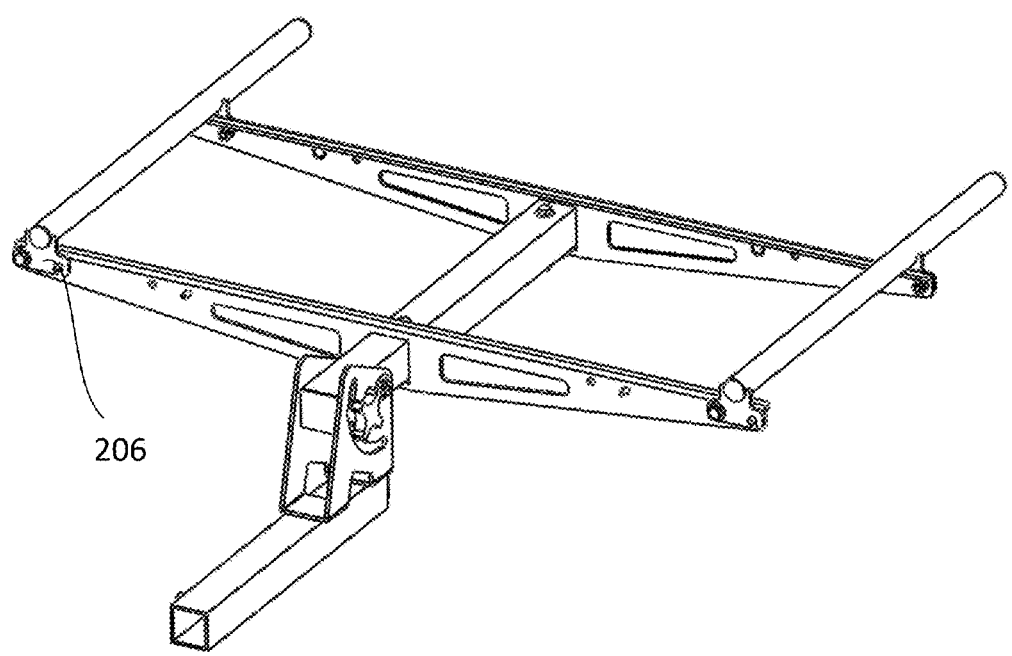
FIG. 43 is an isometric view of the embodiment of the invention horizontal, without accessories, and showing the arrangements used to secure the standardized load bars to the secondary rack members.
Figure 44:
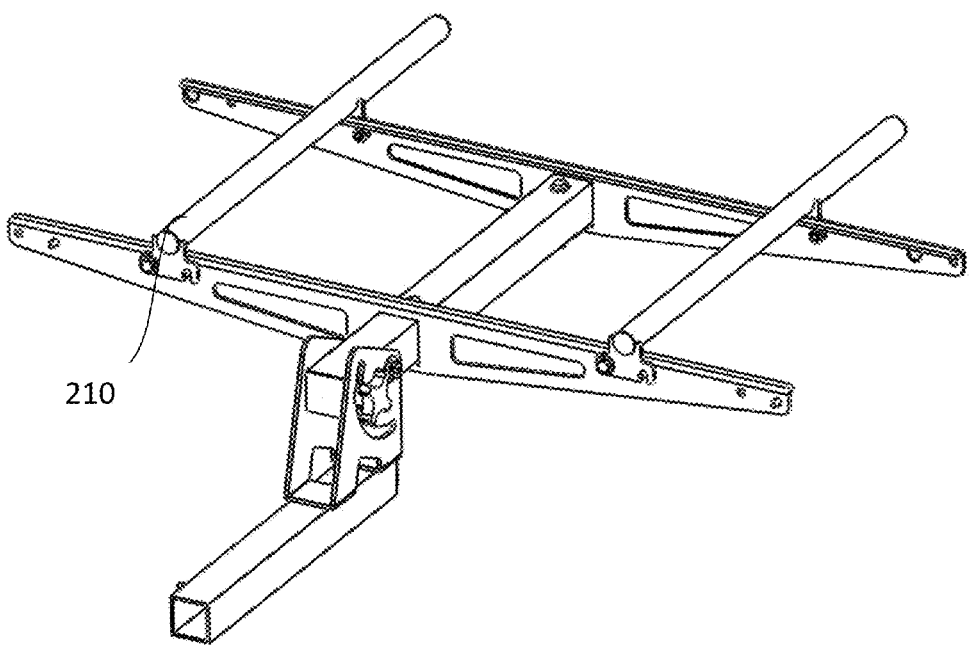
FIG. 44 is an isometric view of the embodiment of the invention horizontal, without accessories, and showing the arrangements used to secure the standardized load bars to the secondary rack members in the inner location rather than the outer location.

FIG. 43 is an isometric view of the embodiment of the invention horizontal, corresponding to the view of FIG. 41, that is, being without accessories, and showing the arrangements used to secure the standardized load bars to the secondary rack members. This view shows fairly clearly (as does FIG. 44, which is an isometric view of the embodiment of the invention horizontal, without accessories, and showing the arrangements used to secure the standardized load bars to the secondary rack members in the inner location rather than the outer location) that the horizontal deployment position is not the end of the race of the pivot plate, that is, the adjustment knob is not at the end of the arcuate aperture for the horizontal position. (It need not be at the other end of the aperture for the vertical position either, in optional embodiments.)

Figure 45:
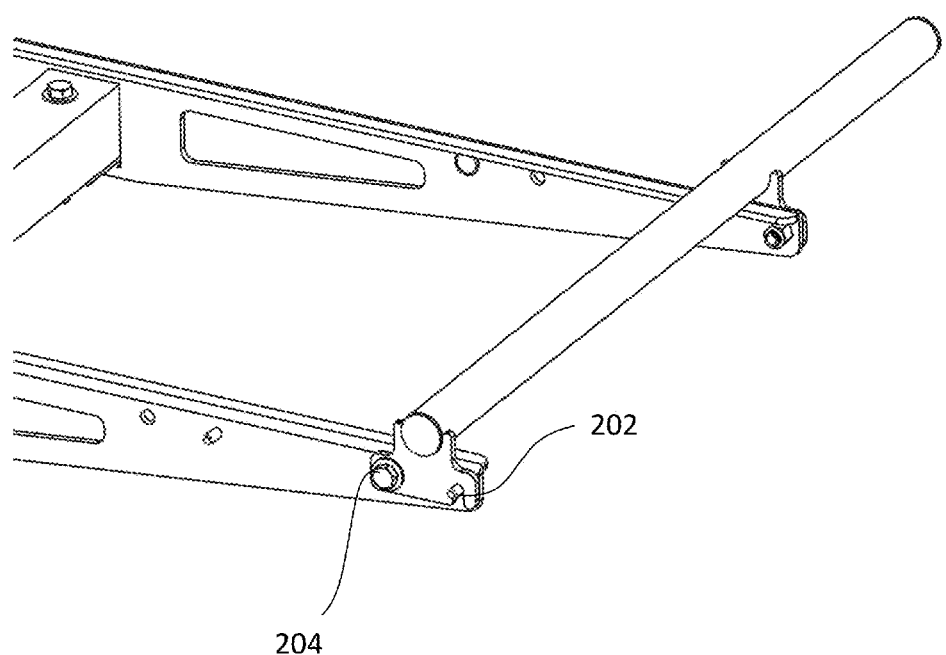
FIG. 45 is a close up isometric partial view of the steel member embodiment, showing in greater detail the engagement of slot and post.

FIG. 45 is a close up isometric partial view of the steel member embodiment, showing in greater detail the engagement of slot and post and how the post and slot are dimensioned and configured to mechanically engage one another.

Figure 46:
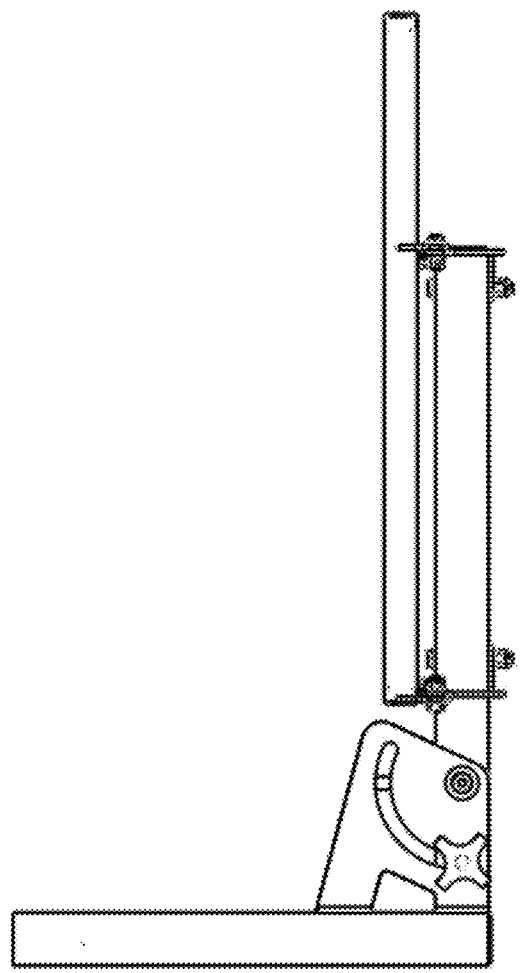
FIG. 46 is a side view of the same embodiment in the vertical or stowed position. Note that the embodiments may be stowed in positions which are not exactly vertical; it may lean toward or away from the vehicle by a small degree within the meaning of the word vertical as used herein.
Figure 47:
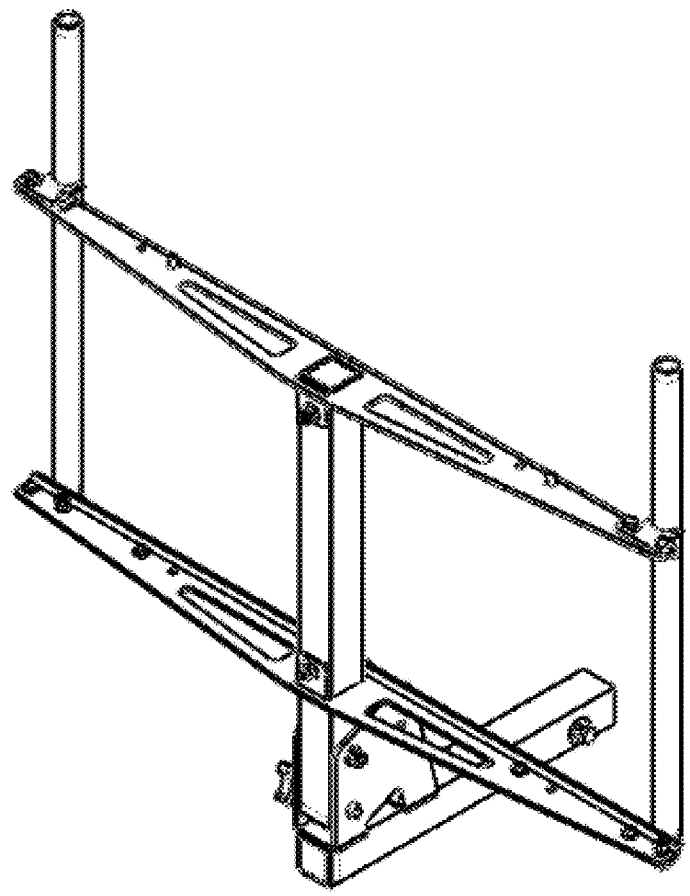
FIG. 47 is an isometric view of the steel embodiment vertical.
Figure 48:
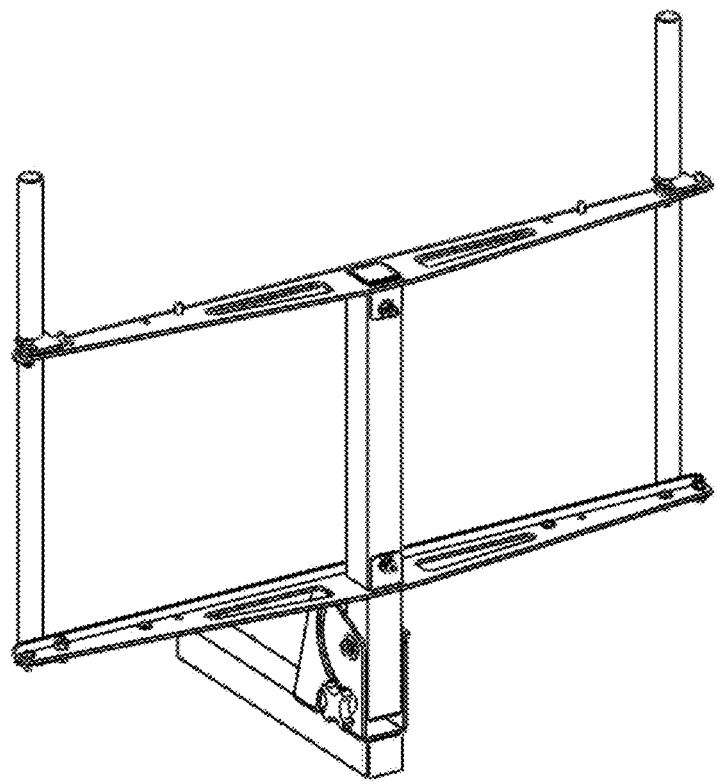
FIG. 48 is an isometric view of the steel embodiment vertical.

FIG. 46 is a side view of the same embodiment in the vertical or stowed position. Note that the embodiments may be stowed in positions which are not exactly vertical; it may lean toward or away from the vehicle by a small degree within the meaning of the word vertical as used herein. FIG. 47 is an isometric view of the steel embodiment vertical and FIG. 48 is an isometric view of the steel embodiment vertical both again showing the vertical position.

Figure 49:
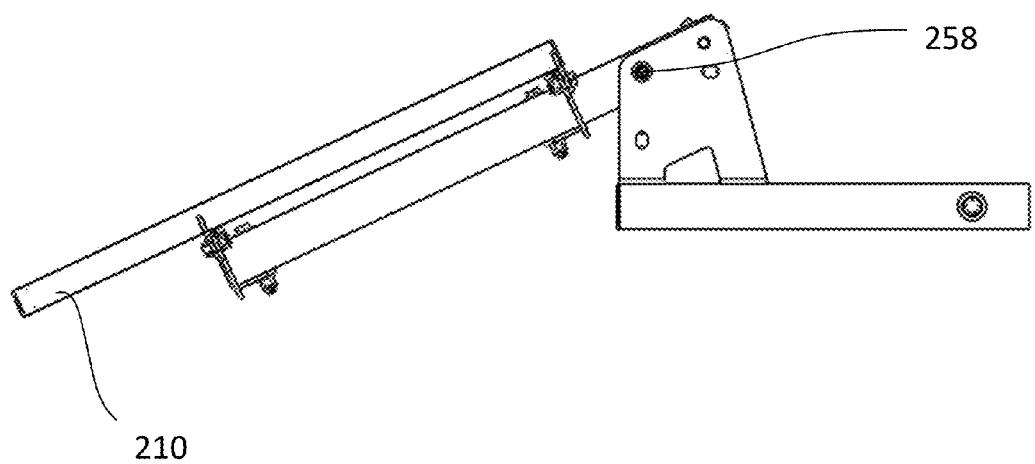
FIG. 49 is a side view showing the flexibility and utility of the invention, with the end of the standardized load bars lowered substantially below the level of the hitch.

FIG. 49 is a side view showing the flexibility and utility of the invention, with the end of the standardized load bars 210 lowered substantially below the level of the hitch by rotation about swivel shaft/bolt 258.

Figure 50:
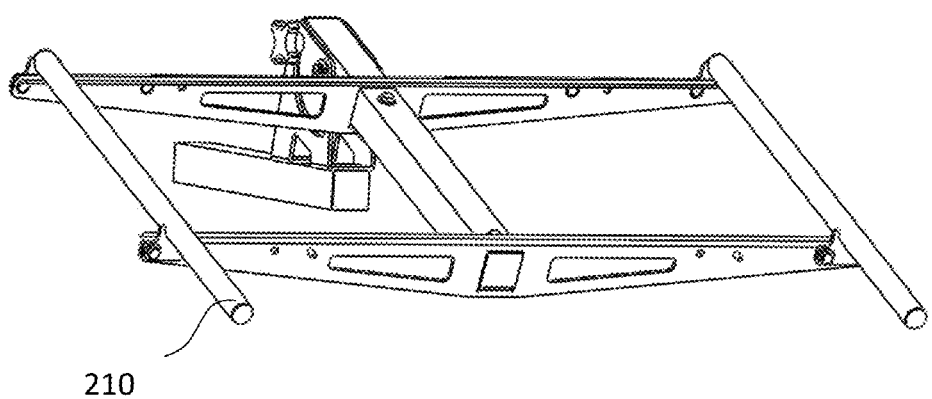
FIG. 50 is an isometric view showing the flexibility and utility of the invention, with the end of the standardized load bars lowered substantially below the level of the hitch.

FIG. 50 is an isometric view showing the flexibility and utility of the invention, with the end of the standardized load bars lowered substantially below the level of the hitch.

Figure 51:
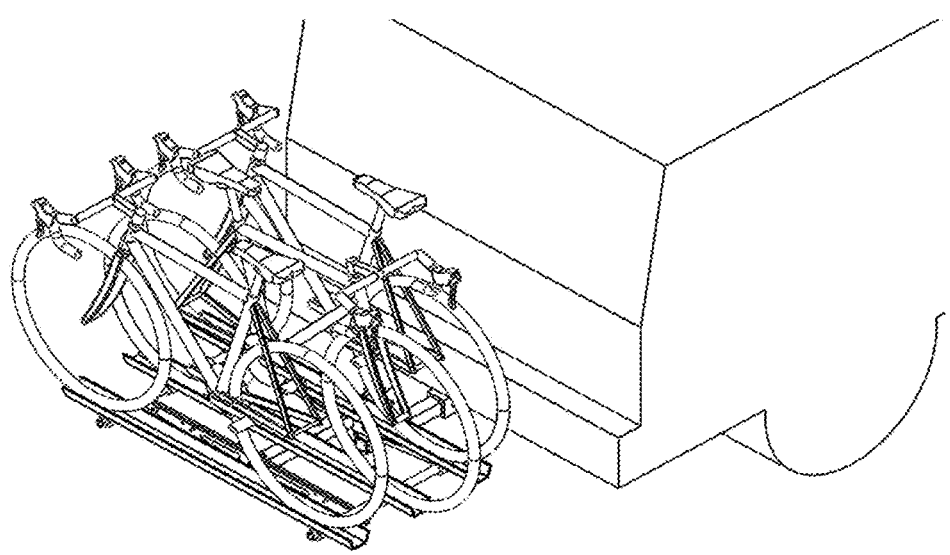
FIG. 51 is an isometric view of the steel embodiment with the bicycle rack accessory in use and bicycles mounted on the device.
Figure 52:
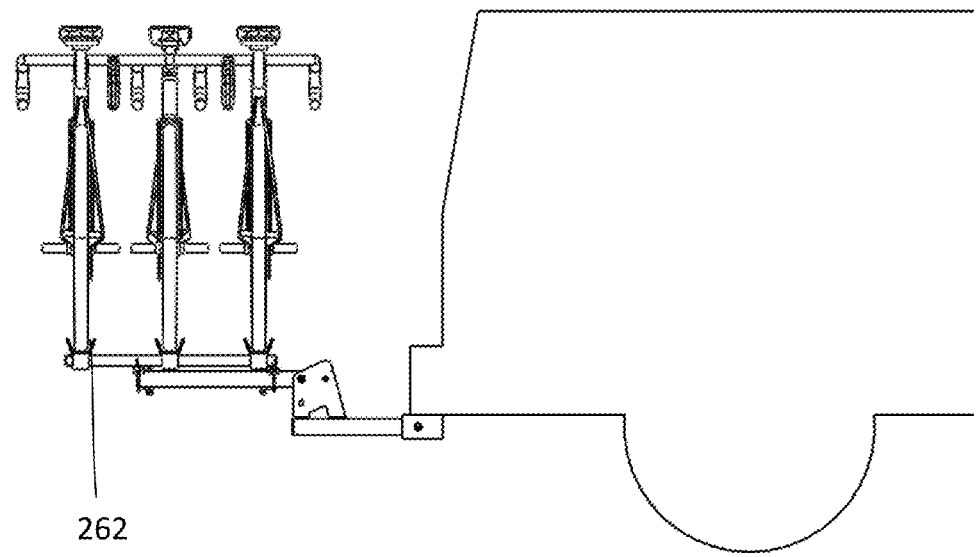
FIG. 52 is a side view of the device in the horizontal position for transport.
Figure 53:
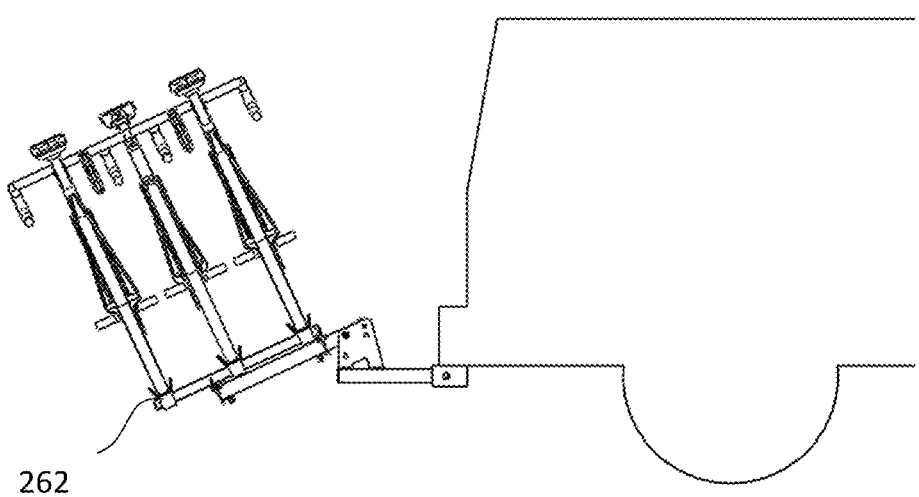
FIG. 53 is a side view of the device in the depressed angle position for convenient loading and unloading and access to the back of the vehicle.
Figure 54:
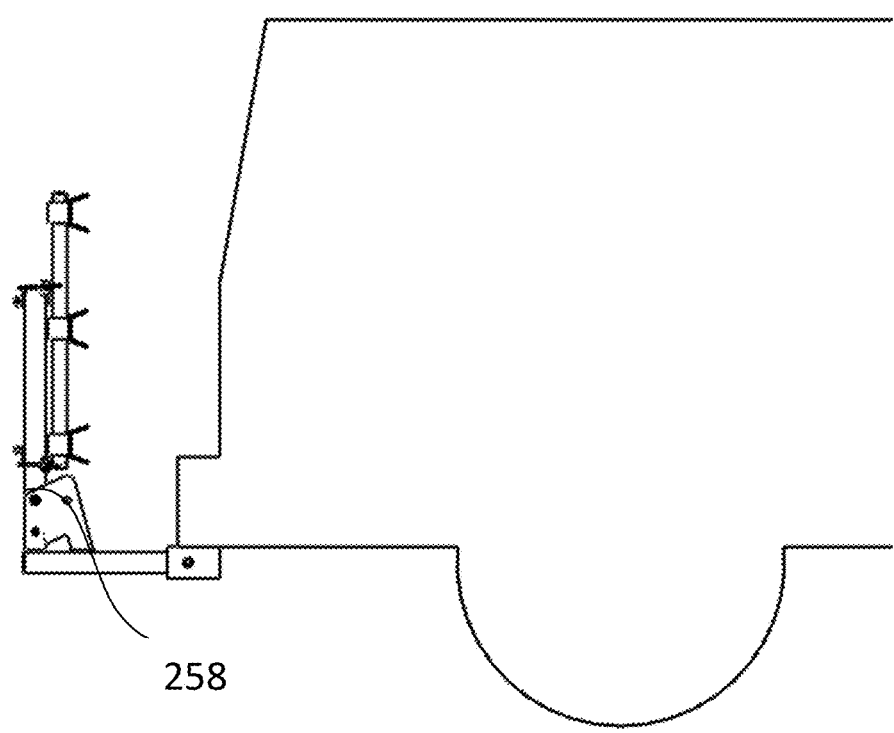

FIG. 51 is an isometric view of the steel embodiment with the bicycle rack accessory in use and bicycles mounted on the device. A bicycle accessory rack may be seen attached to the standardized load bars. In FIG. 52, which is a side view of the device in the horizontal position for transport, the device is horizontal, but in FIG. 53 (a side view of the device in the depressed angle position for convenient access to the vehicle rear and potentially for convenient loading and unloading) the device is much lower at one end, while FIG. 54 (a side view of the device in the vertical position for stowage, when not in use, but with the accessory bicycle racks left on) it is vertical. The bike racks are not wide enough to cause any issue with the back of the vehicle, due to the length of the mount.

Figure 55:
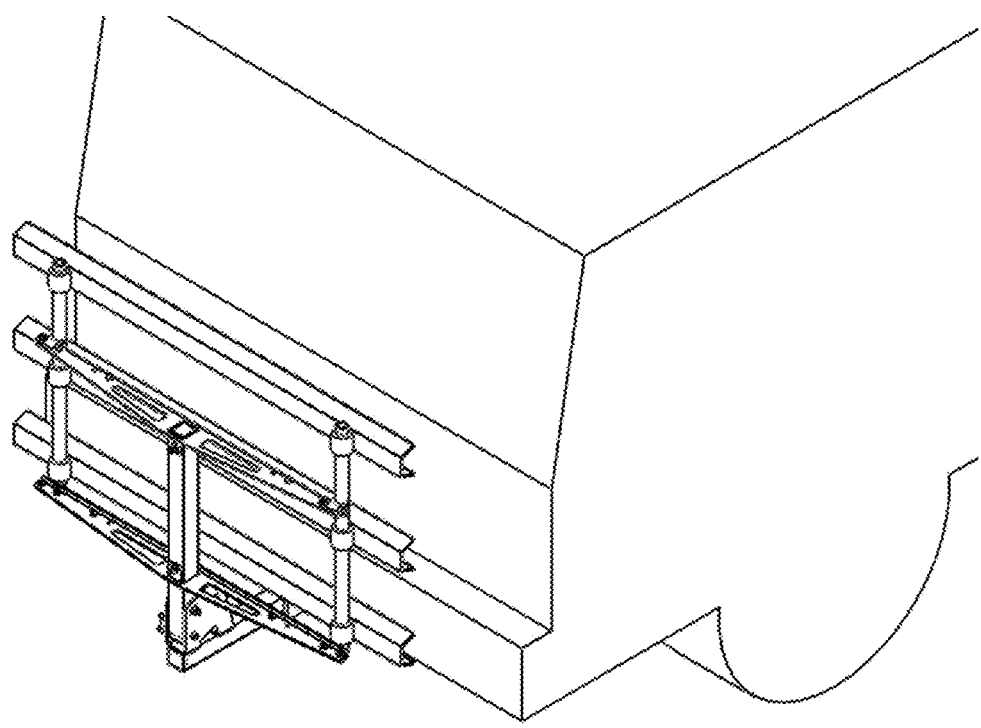
Figure 56:
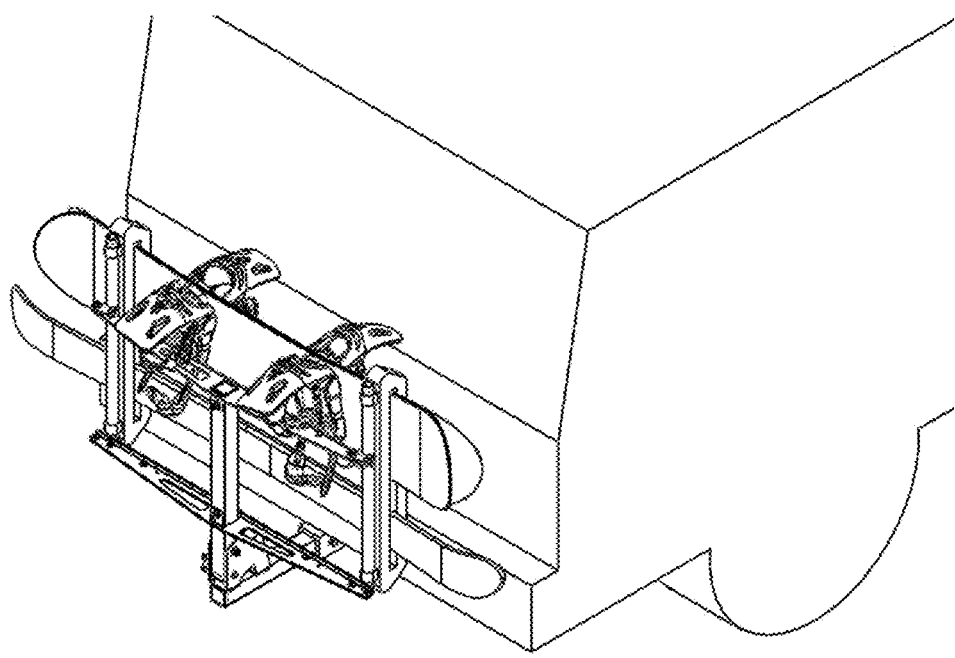

FIG. 55 is an isometric view of the device in the vertical position for stowage, but with the accessory racks left on, FIG. 56 is an isometric view of the device in the vertical position but in use, with sporting equipment which allows for vertical transportation and with the accessory racks (ski gear) left on, again, this is made possible by the length of the mount, so the vehicle back will normally not be impacted.

Figure 57:
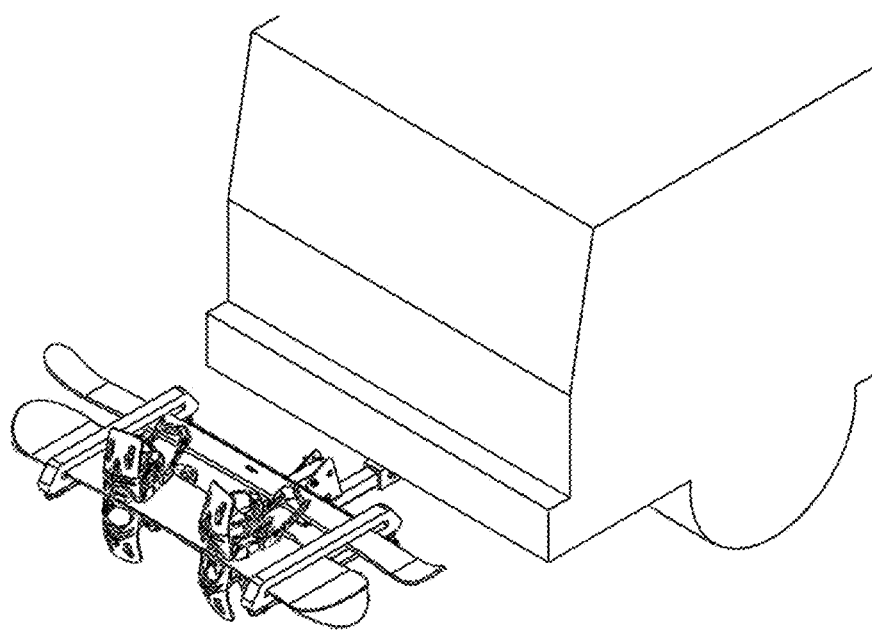
FIG. 57 is an isometric view of the device in the horizontal position for easy loading or unloading.

FIG. 57 is an isometric view of the device in the horizontal position for easy loading or unloading, with sporting equipment which may be more easily handled without use of the depressed angle position.

EXAMPLES

In one typical example, the load bars may be of a rectangular cross section such as are sold under the THULE® brand name.

In another typical example, the load bars may be of a circular cross-section such as are sold under the YAKIMA® brand name. Neither trademark owner is associated with the present applicant.

Testing has revealed that the device is stable, easy to use, and safe.

INDUSTRIAL APPLICABILITY

The present invention is relevant to the sporting goods and vehicle industries, and in particular offers energy savings in the form of increased gas mileage for motor vehicles, and offers increased flexibility of standard roof rack accessories.

REFERENCE SIGNS LIST 2a, 2b Support frame vertical members of Prior Art
4 Gas cylinder of Prior Art
6 Crossbars of Prior Art
10 Standardized load bars
12 Secondary rack members
14 Main rack member
16 Swivel/pivot plates
18 Mount
20 Load bar to secondary rack member connection points
22 Mount to vehicle connection points
26 Specialized sporting equipment carrier for bicycles
26b Specialized sporting equipment carrier for skis or snowboards
28 Vehicle
30a, 30b Pivot pin positions
32 Load bar quick connection (encircling form)
34 Snowboard
40 Post
42 Slot
44 Nut & Bolt
110 Standardized load bars
112 Secondary rack members
114 Main rack member
116 Swivel/pivot plates
118 Mount/main member
122 Hitch bolt (mount to vehicle connection points)
150 End of rack
152 Inner bar
154 Outer bar
156 Adjustment knob
158 Swivel shaft/bolt
160 Adjustment race
162 Flange (forms C-beam)
164 Bicycle
166 Trailer hitch of vehicle
168 Ski
170 Ski accessory rack (snowboard)
172 Bicycle accessory rack
200 Secondary rack member
202 Post
204 Hole
206 Load bar connection
210 Load bar
222 Adjustment knob
258 Swivel shaft/bolt
262 Bicycle accessory rack

CITATION LIST

Patent Literature

The following patent literature is cited by the applicant to the office in this case: U.S. Pat. Nos. 6,662,983; 5,996,870; 6,616,022; 6,460,887; 5,800,294; 6,997,497; 5,009,337; 6,866,315; 6,874,804; 8,281,969; 8,141,760; 5,413,260; 5,476,201; 5,680,976; 5,820,004; 5,806,737; 5,664,717; 5,560,666; 6,010,049; 7,111,765; 8,240,529; 7,784,657; 7,222,763; 6,845,895; 5,938,092; 7,815,084; 5,950,890; 6,0506,27; 6,237,824; 6,511,088; 6,179,184; 6,237,823; and 5,460,304.

Non-Patent Literature www.wizardkinetics.com
www.innoracks.com/details/inh100hitchbase/
http://kuatracks.com/en/products/hitch/nv-core/#features I, Stephen Donnigan, claim:

1. A sporting equipment carrier for use with a vehicular receiver mounted on a vehicle having a bumper, the carrier comprising:
   a mount; the mount having a horizontal member having a first end extending into the receiver and a second end protruding from such receiver, the mount excluding a vertical member;
   a main rack member extending from the mount;
   a plurality of secondary members extending horizontally from and perpendicular to the main rack member;
   a plurality of standard load bars extending horizontally from the secondary members and parallel to the mount and perpendicular to such vehicle bumper,
   a pivot connecting the mount to the main rack member, the pivot having at least three positions, a first position in which the main rack member, secondary rack members and standard load bars remain horizontal and a second position in which the main rack member, secondary rack members and standard load bars rotate to a vertical orientation, and a third position in which the main rack member, secondary rack members and standard load bars rotate below the horizontal first position.

2. The sporting equipment carrier of claim 1, further comprising:
   a plurality of positions at which the standard load bars may be placed, whereby a distance between the standard load bars may be changed.

3. The sporting equipment carrier of claim 2, further comprising:
   a plurality of quick disconnect couplers connecting the standard load bars to the secondary rack members, whereby the standard load bars may be easily removed, whereby a second different group of standard load bars may be easily installed.

4. The sporting equipment carrier of claim 3, wherein each quick disconnect coupler further comprises:
   at least one hole passing through the disconnect coupler, the hole through the disconnect coupler aligning to a hole passing through the secondary rack members, and a bolt passing through both of the holes;
   and at least one slot oriented to open downward;

the secondary rack member having thereon at least one post dimensioned and configured to engage the at least one slot of the quick disconnect coupler when the two holes are aligned.

5. The sporting equipment carrier of claim 3, wherein each standard load bar further comprises:
a U shaped planform having inner and outer parts and an end part connecting the inner and outer parts.

6. The sporting equipment carrier of claim 5, wherein each quick disconnect couple further comprises:
a central portion connected to one of the secondary rack members and two leg portions extending upward, wherein the leg portions are of different lengths;
whereby when the quick disconnect coupler is connected to one of the secondary rack members in a first position, the inner part of the standard load bar is higher than the outer part of the standard load bar, and when the quick disconnect coupler is connected to one of the secondary rack members in a second position, the outer part of the standard load bar is higher than the inner part of the standard load bar.

7. The sporting equipment carrier of claim 1, the secondary members having a C-beam cross-section.

8. The sporting equipment carrier of claim 1, wherein the pivot further comprises:
a plate having an arcuate race passing therethrough, the plate secured to the mount;
a hinge bolt passing through the plate and through the main rack member whereby they are pivotally attached;
an adjustment knob having an extension passing through the plate and through the main rack member, the adjustment knob having first and second adjustment positions, the first adjustment position being loose whereby the main rack member may pivot in relation to the mount and the pivot may attain any of the first, second and third pivot positions, the second adjustment position being tight, whereby the main rack member is secured and may not pivot.

9. A sporting equipment carrier for use with a vehicular receiver mounted on a vehicle having a bumper, the carrier comprising:
a mount; the mount having a horizontal member having a first end extending into the receiver and a second end protruding from such receiver, the mount excluding a vertical member;
a main rack member extending from the mount;
a plurality of secondary members extending horizontally from the main rack member at an angle thereto;
a plurality of standard load bars extending horizontally from the secondary members and parallel to the mount and perpendicular to the bumper,
a pivot connecting the mount to the main rack member, the pivot having at least three positions, a first position in which the main rack member, secondary rack members and standard load bars remain horizontal and a second position in which the main rack member, secondary rack members and standard load bars rotate to a vertical orientation, and a third position in which the main rack member, secondary rack members and standard load bars rotate below the horizontal first position.

10. The sporting equipment carrier of claim 9, further comprising:
a plurality of positions at which the standard load bars may be placed, whereby a distance between the standard load bars may be changed.

11. The sporting equipment carrier of claim 10, further comprising:
a plurality of quick disconnect couplers connecting the standard load bars to the secondary rack members, whereby the standard load bars may be easily removed, whereby a second different group of standard load bars may be easily installed.

12. The sporting equipment carrier of claim 11, wherein each quick disconnect coupler further comprises:
at least one hole passing through the disconnect coupler, the hole through the disconnect coupler aligning to a hole passing through the secondary rack members, and a bolt passing through both of the holes;
and at least one slot oriented to open downward;
the secondary rack member having thereon at least one post dimensioned and configured to engage the at least one slot of the quick disconnect coupler when the two holes are aligned.

13. The sporting equipment carrier of claim 11, wherein each standard load bar further comprises:
a U shaped planform having inner and outer parts and and end part connecting the inner and outer parts.

14. The sporting equipment carrier of claim 13, wherein each quick disconnect couple further comprises:
a central portion connected to one of the secondary rack members and two leg portions extending upward, wherein the leg portions are of different lengths;
whereby when the quick disconnect coupler is connected to one of the secondary rack members in a first position, the inner part of the standard load bar is higher than the outer part of the standard load bar, and when the quick disconnect coupler is connected to one of the secondary rack members in a second position, the outer part of the standard load bar is higher than the inner part of the standard load bar.

15. The sporting equipment carrier of claim 9, the secondary members having a C-beam cross-section.

16. The sporting equipment carrier of claim 9, wherein the pivot further comprises:
a plate having an arcuate race passing therethrough, the plate secured to the mount;
a hinge bolt passing through the plate and through the main rack member whereby they are pivotally attached;
an adjustment knob having an extension passing through the plate and through the main rack member, the adjustment knob having first and second adjustment positions, the first adjustment position being loose whereby the main rack member may pivot in relation to the mount and the pivot may attain any of the first, second and third pivot positions, the second adjustment position being tight, whereby the main rack member is secured and may not pivot.

* * * * *